US012762662B2

(12) United States Patent
Zhu et al.

(10) Patent No.: US 12,762,662 B2
(45) **Date of Patent: *Oct. 13, 2026**

(54) SPATIALLY VARYING REDUCTION OF HAZE IN IMAGES

(71) Applicant: Google LLC, Mountain View, CA (US)

(72) Inventors: Xiang Zhu, Santa Clara, CA (US); Mark Alan Duchaineau, Livermore, CA (US); Yuxin Hu, Stanford, CA (US)

(73) Assignee: GOOGLE LLC, Mountain View, CA (US)

( * ) Notice: Subject to any disclaimer, the term of this patent is extended or adjusted under 35 U.S.C. 154(b) by 290 days.

This patent is subject to a terminal disclaimer.

(21) Appl. No.: 18/469,144

(22) Filed: Sep. 18, 2023

(65) Prior Publication Data

US 2024/0007600 A1 Jan. 4, 2024

Related U.S. Application Data

(63) Continuation of application No. 16/764,753, filed as application No. PCT/US2019/067905 on Dec. 20, 2019, now Pat. No. 11,800,076.

(51) Int. Cl.
*G06T 5/70* (2024.01)
*G06T 3/40* (2024.01)
(Continued)

(52) U.S. Cl.
CPC .................. *G06T 5/70* (2024.01); *G06T 3/40* (2013.01); *G06T 5/20* (2013.01); *G06V 10/56* (2022.01);
(Continued)

(58) Field of Classification Search
CPC .... G06T 5/70; G06T 3/40; G06T 5/20; G06T 2207/10024; G06T 2207/10032;
(Continued)

(56) References Cited

U.S. PATENT DOCUMENTS 5,187,754 A 2/1993 Currin et al.
9,478,016 B2 10/2016 Huang et al.
(Continued)

FOREIGN PATENT DOCUMENTS

CN 103345732 10/2013
CN 105719247 6/2016
(Continued)

OTHER PUBLICATIONS

CN108765310 Huang et al, machine translated (Year: 2018).*
(Continued)

*Primary Examiner* — Jianxun Yang
(74) *Attorney, Agent, or Firm* — DORITY & MANNING, P.A.

(57) ABSTRACT

Methods, systems, devices, and tangible non-transitory computer readable media for haze reduction are provided. The disclosed technology can include generating feature vectors based on an input image including points. The feature vectors can correspond to feature windows associated with features of different portions of the points. Based on the feature vectors and a machine-learned model, a haze thickness map can be generated. The haze thickness map can be associated with an estimate of haze thickness at each of the points. Further, the machine-learned model can estimate haze thickness associated with the features. A refined haze thickness map can be generated based on the haze thickness map and a guided filter. A dehazed image can be generated based on application of the refined haze thickness map to the input image. Furthermore, a color corrected dehazed image can be generated based on performance of color correction operations on the dehazed image.

20 Claims, 9 Drawing Sheets

(51) Int. Cl.

| | |
|---|---|
| ***G06T 5/20*** | (2006.01) |
| ***G06V 10/56*** | (2022.01) |
| ***G06V 10/764*** | (2022.01) |
| ***G06V 10/77*** | (2022.01) |
| ***G06V 10/774*** | (2022.01) |
| ***H04N 23/88*** | (2023.01) |

(52) U.S. Cl.
CPC ........ *G06V 10/764* (2022.01); *G06V 10/7715* (2022.01); *G06V 10/774* (2022.01); *H04N 23/88* (2023.01); *G06T 2207/10024* (2013.01); *G06T 2207/10032* (2013.01); *G06T 2207/20016* (2013.01); *G06T 2207/20021* (2013.01); *G06T 2207/20081* (2013.01); *G06T 2207/30181* (2013.01)

(58) Field of Classification Search
CPC . G06T 2207/20016; G06T 2207/20021; G06T 2207/20081; G06T 2207/30181; G06T 5/60; G06V 10/56; G06V 10/764; G06V 10/7715; G06V 10/774; H04N 23/88
See application file for complete search history.

(56) References Cited

U.S. PATENT DOCUMENTS

| | | | | |
|---|---|---|---|---|
| 2003/0007699 | A1 | 1/2003 | Trifonov et al. | |
| 2010/0067823 | A1 | 3/2010 | Kopf et al. | |
| 2010/0195899 | A1 | 8/2010 | Nc et al. | |
| 2011/0188775 | A1 | 8/2011 | Sun et al. | |
| 2016/0071244 | A1 | 3/2016 | Huang et al. | |
| 2017/0132771 | A1 | 5/2017 | Agaian et al. | |
| 2019/0180423 | A1 | 6/2019 | Lukac et al. | |
| 2022/0392022 | A1* | 12/2022 | Gan .......................... | G06T 7/90 |

FOREIGN PATENT DOCUMENTS

| | | |
|---|---|---|
| CN | 105740867 | 7/2016 |
| CN | 107527325 | 12/2017 |
| CN | 108765342 | 11/2018 |
| CN | 109064419 | 12/2018 |
| CN | 110111268 | 8/2019 |
| CN | 110223240 | 9/2019 |
| CN | 106709893 | 11/2019 |
| JP | 2019165832 | 10/2019 |

OTHER PUBLICATIONS

CN109389569 Chen, machine translated (Year: 2019).*
CN107317971 Yuan, machine translated (Year: 2017).*
Chinese Search Report Corresponding to Application No. 2019800230038 on May 21, 2024.
Chinese Search Report Corresponding to Application No. 2019800230038 on Oct. 30, 2024.
Cai et al., "DehazeNet: An End-to-End System for Single Image Haze Removal", Institute of Electrical and Electronics Engineers Transactions on Image Processing, vol. 25, No. 11, Nov. 2016, pp. 5187-5198.
Fang et al., "Variational Single Image Dehazing for Enhanced Visualization," Institute of Electrical and Electronics Engineers Transactions on Multimedia, vol. 22, Issue 10, Dec. 11, 2019, pp. 2537-2550.
He et al., "Single Image Haze Removal Using Dark Channel Prior", Institute of Electrical and Electronics Engineers Conference on Computer Vision and Pattern Recognition, Miami, Florida, United States, Jun. 20-25, 2009, 8 pages.
International Preliminary Report on Patentability for Application No. PCT/US2019/067905, mailed Jun. 30, 2022, 9 pages.
International Search Report and Written Opinion for Application No. PCT/US2019/067905, mailed Jul. 31, 2020, 13 pages.
Shin et al., "Dual Domain Method for Single Image Dehazing and Enhancing", Institute of Electrical and Electronics Engineers International Conference on Acoustics, Speech and Signal Processing, Prague, Czech Republic, May 22-27, 2011, pp. 1265-1268.
Tang et al., "Investigating Haze-Relevant Features in a Learning Framework for Image Dehazing", Institute of Electrical and Electronics Engineers Conference on Computer Vision and Pattern Recognition, Columbus, Ohio, United States, Jun. 23-28, 2014, 8 pages.
Yang et al., "Proximal Dehaze-Net: A Prior Learning-Based Deep Network for Single Image Dehazing", Proceedings of the European Conference on Computer Vision, Munich, Germany, Sep. 8-14, 2018, pp. 707-717.

* cited by examiner

SPATIALLY VARYING REDUCTION OF HAZE IN IMAGES

RELATED APPLICATIONS

This application is a continuation of U.S. application Ser. No. 16/764,753 having a filing date of May 15, 2020, which is based upon and claims the right of priority under 35 U.S.C. § 371 to International Application No. PCT/US2019/067905 filed on Dec. 20, 2019. Applicant claims priority to and the benefit of each of such applications and incorporates all such applications herein by reference in their entirety for all purposes.

FIELD

The present disclosure relates generally to haze reduction and in particular to a system for reducing haze in images that uses machine-learning models.

BACKGROUND

Operations associated with machine-learning models can be implemented on a variety of computing devices. These operations can include processing various inputs to generate outputs for access and use by a user or another computing system. Further, the operations can include evaluating operations performed by various computing systems. However, the types of inputs and the ways in which the operations are performed can change over time, as can the underlying hardware that implements the operations. Accordingly, there are different ways to leverage computing resources associated with machine-learning models.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of haze reduction. The computer-implemented method can include generating, by a computing system including one or more processors, based at least in part on an input image comprising a plurality of points, a plurality of feature vectors associated with a plurality of feature windows based at least in part on one or more features of different portions of the plurality of points. Further, the computer-implemented method can include generating, by the computing system, based at least in part on the plurality of feature vectors and one or more machine-learned models, a haze thickness map associated with an estimate of haze thickness at each of the plurality of points. The one or more machine-learned models can be configured to perform operations including estimating haze thickness associated with the one or more features. The computer-implemented method can also include generating, by the computing system, based at least in part on the haze thickness map and a guided filter, a refined haze thickness map. The computer-implemented method can include generating, by the computing system, a dehazed image based at least in part on application of the refined haze thickness map to the input image. Furthermore, the computer-implemented method can include generating, by the computing system, a color corrected dehazed image based at least in part on performance of one or more color correction operations on the dehazed image.

Another example aspect of the present disclosure is directed to one or more tangible non-transitory computer-readable media storing computer-readable instructions that when executed by one or more processors cause the one or more processors to perform operations. The operations can include generating, based at least in part on an input image comprising a plurality of points, a plurality of feature vectors associated with a plurality of feature windows based at least in part on one or more features of different portions of the plurality of points. Further, the operations can include generating, based at least in part on the plurality of feature vectors and one or more machine-learned models, a haze thickness map associated with an estimate of haze thickness at each of the plurality of points. The one or more machine-learned models can be configured to perform operations including estimating haze thickness associated with the one or more features. The operations can also include generating, based at least in part on the haze thickness map and a guided filter, a refined haze thickness map. The operations can include generating, a dehazed image based at least in part on application of the refined haze thickness map to the input image. Furthermore, the operations can include generating a color corrected dehazed image based at least in part on performance of one or more color correction operations on the dehazed image.

Another example aspect of the present disclosure is directed to a computing system that can include: one or more processors; and one or more tangible non-transitory computer-readable media storing instructions that when executed by the one or more processors cause the one or more processors to perform operations. The operations can include generating, based at least in part on an input image comprising a plurality of points, a plurality of feature vectors associated with a plurality of feature windows based at least in part on one or more features of different portions of the plurality of points. Further, the operations can include generating, based at least in part on the plurality of feature vectors and one or more machine-learned models, a haze thickness map associated with an estimate of haze thickness at each of the plurality of points. The one or more machine-learned models can be configured to perform operations including estimating haze thickness associated with the one or more features. The operations can also include generating, based at least in part on the haze thickness map and a guided filter, a refined haze thickness map. The operations can include generating, a dehazed image based at least in part on application of the refined haze thickness map to the input image. Furthermore, the operations can include generating a color corrected dehazed image based at least in part on performance of one or more color correction operations on the dehazed image.

Other example aspects of the present disclosure are directed to other methods, systems, devices, apparatuses, or tangible non-transitory computer-readable media for haze reduction.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
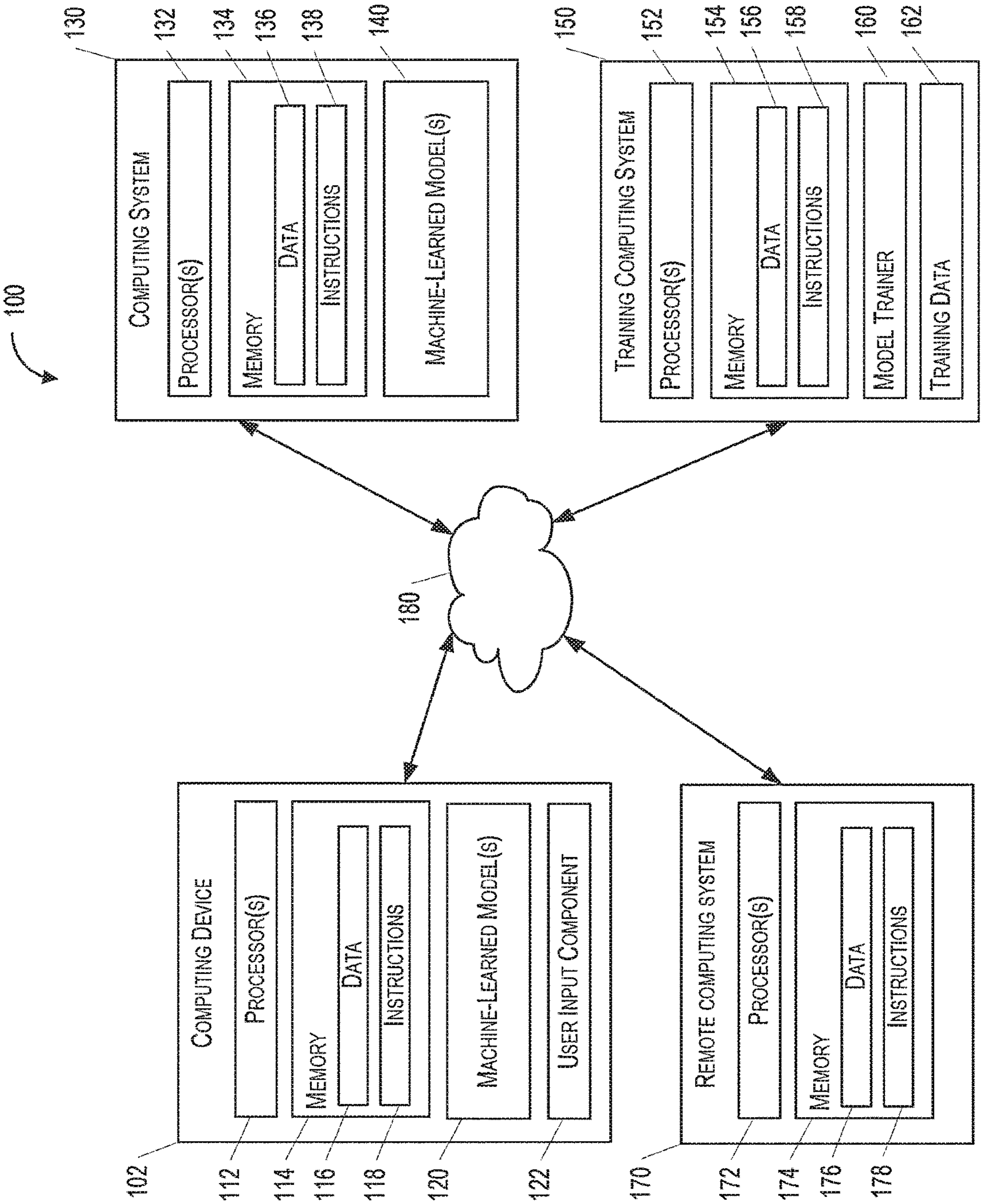
FIG. 1 depicts a diagram of an example system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a computing system that can be used for a variety of purposes including the removal of haze (e.g., clouds or other atmospheric particles) or other noise from images, thereby providing image enhancement through the denoising of images. In particular, the disclosed technology can perform operations on images that are hazy including using machine-learned models and other techniques such as filtration, to remove the haze from the image. Further, the disclosed technology can use the relationship between dark channel information and haze to determine certain aspects of haze thickness in a variety of images including satellite images. As such, haze or other noise in images can be reduced or removed through use of a combination of different techniques.

The disclosed technology can be implemented in a computing system (e.g., a haze reduction computing system) that is configured to access data including information associated with a hazy image and perform operations on the data to reduce the amount of haze in the image. The computing system can include machine-learned models that have been trained to reduce haze in images and can be part of an image processing pipeline that can be used to output haze-reduced images as an end product.

By way of example, the disclosed technology can be configured to access an input image (e.g., an image of a geographic area captured by an overhead satellite) and generate feature vectors that correspond to feature windows of respective portions of the image (e.g., a square grouping of pixels). The haze reduction computing system can then generate a haze thickness map that indicates the estimated thickness of haze associated with each pixel in the image. In some implementations, the haze thickness map is based in part on dark channel information associated with the darkest pixel in each of the feature windows.

As part of generating the haze thickness map, dark channel information, associated with low intensity pixels, can be used to generate more accurate haze thickness maps. Once the haze thickness map is generated, a guided filter can then be used to refine the haze thickness map. For example, the guided filter can use the input image as a guidance image, which can then be applied to the input image to generate refined version of the haze thickness map that retains edges and smooths noise. The refined haze thickness map can then be applied to the input image to produce a dehazed image. Furthermore, to offset any correction that was performed on the input image prior to generation of the feature vectors, a color correction technique can be applied to the dehazed image to produce a color corrected dehazed image. The dehazed image or color corrected dehazed image may be output for further use. For example, the dehazed image or color corrected dehazed image may be output to a display apparatus to be displayed, or may be output to a computing system for classification and/or analysis of the image Accordingly, the disclosed technology can improve the effectiveness with which haze in images is reduced, thereby allowing for an improvement in the performance of a haze reduction pipeline. Further, the use of dark channel information and machine-learned models that are trained to analyze particular types of images (e.g., satellite images) can result in better quality haze reduction.

The haze reduction computing system can be configured to generate a plurality of feature vectors. The plurality of feature vectors can be based at least in part on an input image that includes a plurality of points (e.g., a plurality of pixels). For example, the input image can include an overhead image of a geographic area captured by cameras mounted on an airplane that flew over the geographic area. Further, the input image can be hazy and/or noisy. As described herein, haze can include and/or be associated with anything that reduces and/or degrades the visual quality of an image. Further, haze can include noise or anything else that obscures and/or distorts one or more portions of an image. For example, haze can include smoke, clouds, dust, and/or other particles suspended in an the air that reduce the transparency of the air and thereby obscure one or more objects in the same area. By way of further example, haze can include clouds and/or smoke that cover one or more portions of an image of the ground captured by a ground-facing camera located on a satellite.

Further, the plurality of feature vectors can be associated with or correspond to a plurality of feature windows that are based at least in part on or are associated with, one or more features of different portions of the plurality of points. For example, the plurality of feature vectors can be associated with one or more features (e.g., visual features) of the points in each of the feature windows.

In some embodiments, the one or more features can include a dark channel, a hue of a point, a saturation of a point, and/or an intensity (e.g., brightness) of a point. The dark channel or dark channel information can be associated with the points that have a low (e.g., beneath some threshold determined to be low) or lowest intensity in at least one color channel of a color space (e.g., the R channel of an RGB color space). In some embodiments, the dark channel can be correlated with haze thickness in an image. Further, the dark channel can be determined based at least in part on the following function: d(x)=min_{x' in window (x)}(min_{c in R,G,B}(Y(x',c)). In the preceding dark channel function, d(x) can represent the dark channel of point x from image Y; window (x) can represent a feature window; Y can represent an input image; c can represent a channel including an R channel, a G channel, or a B channel; and Y(x',c) can represent an intensity (or pixel value) of image Y in c channel at point x' in which x' can be any point in window (x). The dark channel function can be used to evaluate each of the plurality of points in an image (e.g., the input image).

Further, the one or more features can be associated with a color space. For example, the hue and saturation of a point can be respectively expressed as the H and S channels of an HSV color space, and the intensity or brightness of a point can be expressed as the V (value) channel of the HSV color space. In other embodiments, the one or more features can be associated with other color spaces including an RGB color space or a YUV color space.

In some embodiments, generation of the plurality of feature vectors can include determining a plurality of feature windows for each point of the plurality of points. Each of the plurality of feature windows can include a portion of the plurality of points around each point. For example, each of the plurality of feature windows can include a center point (e.g., a point that is an equal distance from each of the edges of the feature window) and a plurality of points clustered around the center point. In some embodiments, the plurality of feature windows can be different shapes including any polygonal shape (e.g., squares or rectangles). Further, each of the plurality of feature windows can include multi-scale feature windows of different sizes in which each feature window includes a different number of points. For example, feature windows could be thirty-one by thirty (31×31) points, twenty-one by twenty-one (21×21) points, and eleven by eleven (11×11) points in size. In some embodiments, a multi-scale feature windows can be nested inside one or more other feature windows. For example, a twenty-one by twenty-one (21×21) point feature window can be nested inside a thirty-one by thirty (31×31) point feature window.

In some embodiments, generation of the plurality of feature vectors can include determining the one or more features associated with a darkest point in each of the plurality of feature windows. The darkest point in each of the plurality of feature windows can be based at least in part on a lowest intensity or brightness value associated with a point. For example, the hue, saturation, and intensity of the darkest pixel in a feature window can be determined.

Furthermore, in some embodiments, generation of the plurality of feature vectors can include generating the plurality of feature vectors based at least in part on the one or more features associated with the darkest point in each of the plurality of feature windows. For example, each of the feature vectors can include the hue, saturation, and intensity associated with the darkest point in each of the plurality of feature windows.

In some embodiments, generation of the plurality of feature vectors can include adjusting a size of the plurality of feature windows based at least in part on the image type associated with the input image. Adjusting the size of a feature window can include various operations including determining an image type associated with the input image. The image type can be determined based at least in part on the input image. Further, the image type can be based at least in part on content depicted in the input image. In some embodiments, the content depicted in the input image can be associated with the color values of the plurality of points in the input image. For example, certain images have a greater preponderance of certain color channels, such as the R (red) channel of an RGB color space image having greater representation in an image of a desert than an image of the ocean that is largely composed of points associated with the B (blue) channel of the RGB color space. As a result, a smaller feature window size can be used in portions of an image in which there is a sharp change from one type of feature (e.g., ocean) to another type of feature (e.g., the land at the edge of the ocean).

The size of the plurality of feature windows can then be adjusted based at least in part on the image type. The size of a feature window can be associated with the bias and variance of the haze thickness map. A larger feature window can be associated with a reduction in estimation variance at the expense of greater bias, while a smaller feature window can be associated with increased estimation variance with lower bias.

In some embodiments, the input image can depict an environment captured by one or more sensors of a satellite. Further, the one or more sensors can include one or more cameras or any other type of image capture device. For example, the input image can be based at least in part on satellite imagery or imagery captured from an aircraft.

In some embodiments, the input image can be based at least in part on a non-color corrected raw image on which one or more color correction operations have been performed. For example, the one or more color correction operations performed on the input image can include adjustment of the white balance of the image.

The haze reduction computing system can generate a haze thickness map. The haze thickness map can be based at least in part on the plurality of feature vectors and/or one or more machine-learned models. Further, the haze thickness map can be associated with an estimate of haze thickness (e.g., a magnitude or amount of haze) at each of the plurality of points.

The one or more machine-learned models can be configured and/or trained to perform one or more operations can include estimating haze thickness associated with the one or more features. For example, the one or more machine-learned models can be configured and/or trained to generate an output including an estimated haze thickness of a plurality of points of an image (e.g., a haze thickness map) based at least in part on input associated with an input image (e.g., the plurality of feature vectors).

In some embodiments, the one or more machine-learned model can be configured and/or trained based at least in part on training data. The training data can include images which can include a plurality of simulated hazy images associated with a corresponding plurality of haze thicknesses labels. The haze thickness labels can indicate the thickness of haze at each point in the plurality of simulated hazy images. For example, the plurality of simulated hazy images can be based at least in part on actual images of geographic areas (e.g., satellite images) to which different amounts of simulated haze have been added.

Training the one or more machine-learned models can include providing each of the plurality of simulated hazy images as an input (e.g., an input image) to the one or more machine-learned models. The one or more machine-learned models can then perform one or more operations on the input and generate an output (e.g., a haze thickness map) associated with the respective simulated hazy image. The output can then be applied to the input image to generate a haze reduced image. The output of the one or more machine-learned models can be evaluated based at least in part on one or more comparisons of the haze reduced image to a respective ground-truth image associated with each simulated hazy image (e.g., the same image without the simulated haze). In some embodiments, the one or more comparisons of the haze reduced image to the respective ground-truth image associated with each simulated hazy image can include one or more comparisons of one or more corresponding portions of the haze reduced image to the respective ground-truth image associated with each simulated hazy image.

Based at least in part on the one or more comparisons (e.g., comparisons of the haze reduced image to a respective ground-truth image), an associated loss can be determined based at least in part on evaluation of a loss function associated with the accuracy of the output generated by the one or more machine-learned models. The one or more machine-learned models can include one or more parameters that can be associated with analysis, processing, determination, generation, and/or extraction of one or more features of an input (e.g., the plurality of feature vectors associated with the input image). One or more parameters of the one or more machine-learned models can then be adjusted based at least in part on the contributions that each of the one or more parameters make with respect to minimization of the loss. As such, the one or more parameters of the one or more machine-learned models can be adjusted over a plurality of iterations, such that the loss is reduced, and the accuracy of the haze map and associated haze reduced image generated by the one or more machine-learned models is improved.

By way of example, the one or more parameters of the one or more machine-learned models that do not change the loss (or do not cause the loss to change by more than a threshold amount) can be kept the same; the one or more parameters that decrease the loss can be weighted more heavily (e.g., adjusted to increase their contribution to the loss); and/or the one or more parameters that increase the loss can have their weighting reduced (e.g., adjusting the value associated with the respective parameter to reduce the parameter's contribution to the loss).

In some embodiments, the one or more machine-learned models can include a multi-layer perceptron with at least two layers that can be configured to generate the haze thickness map. In other embodiments, different types of machine-learned models (e.g., convolutional neural networks, recurrent neural networks, and/or recursive neural networks) can be used. Further, the one or more machine-learned models can include different numbers of layers including one layer or a plurality of layers.

The output generated by the one or more machine-learned models can be affected by the datasets provided to the one or more machine-learned models during training of the one or more machine-learned models. As such, different training data can result in different output by the one or more machine-learned models. The performance of the one or more machine-learned models can be positively correlated with the similarity of the input to the input that was used during training of the one or more machine-learned models.

In some embodiments, the one or more machine-learned models can be trained based at least in part on and/or using training data that includes a sampling of images of geographic regions that are weighted based at least in part on a frequency of occurrence of one or more visual features of the geographic regions. For example, the one or more machine-learned models that are trained to dehaze geographic areas that include primarily forest can be trained using samples of images that include a larger proportion of images that depict forests. Further, the one or more visual features can be associated with a dark channel, a hue, a saturation, and/or an intensity of one or more portions of one or more images of bodies of water, forest, mountains, farmland, buildings, roads, desert, and/or plains.

The haze reduction computing system can generate a refined haze thickness map. The refined haze thickness map can be based at least in part on the haze thickness map and/or a guided filter. Use of the guided filter can preserve edges while refining the haze thickness map. Further, the guided filter can result in less gradient distortion (e.g., no gradient reversal) in comparison to other filtration techniques. Additionally, the guided filter is non-iterative, which can result in an improvement in the speed with which the refined thickness map is generated since the guided filter does not have to make multiple passes over the haze thickness map. In some embodiments, generation of the refined haze thickness map can include using the input image as a guidance image for the guided filter.

The haze reduction computing system can generate a dehazed image. The dehazed image can be based at least in part on application of the refined haze thickness map to the input image. For example, the refined haze thickness map can include information associated with the haze thickness associated with each point of the plurality of points in the input image. The haze thickness map can be applied to the input image to dehaze each point of the plurality of points in the input image based at least in part on the corresponding haze thickness of the respective point in the haze thickness map.

Dehazing of the input image can be expressed as the dehazing function: $J(x)=(Y(x)— A*t(x))/(1-t(x))$. In the preceding dehazing function $J(x)$ can be associated with the dehazed image; $Y(x)$ can be associated with the input image (e.g., the hazy input image); A can be associated with global atmospheric light or air-light associated with the input image; and $t(x)$ can be associated with the thickness of the haze thickness map (e.g., the refined haze thickness map).

The haze reduction computing system can generate a color corrected dehazed image. The color corrected dehazed image can be based at least in part on performance of one or more color correction operations on the dehazed image. For example, the haze reduction computing system can perform one or more color correction operations including adjusting a white balance of the dehazed image.

In some embodiments, generating the color corrected dehazed image can include reducing color shift in the dehazed image that resulted from use of one or more color correction operations applied to the input image. For example, the input image can be color corrected prior to the generation of the plurality of feature vectors. As a result, the colors of the input image can be shifted, which can then be reduced by performance of one or more color correction operations after the dehazed image is generated.

In some embodiments, generating the color corrected dehazed image can include replacing low-frequency color space components of the dehazed image with low-frequency color space components of the input image. For example, firstly the input image and the dehazed image can be converted from an RGB color space to a YUV color space. Next, the low frequency components of the UV channels of the dehazed image can be replaced by the low frequency components of the UV channels of the input image. The YUV color space of the dehazed image can then be converted back to the RGB color space.

In some embodiments, generating the color corrected dehazed image can include adjusting one or more colors of the dehazed image based at least in part on conversion of a color space of the dehazed image to a different color space. By way of example, the input image can be associated with an RGB color space and/or the dehazed image can be associated with a YUV color space. Further, the conversion of a color space of the dehazed image to a different color space can include converting the dehazed image from the YUV color space to the RGB color space.

The disclosed technology can include a computing system (e.g., a haze reduction computing system) that is configured to perform various operations associated with reducing haze in images. In some embodiments, the haze reduction computing system can be associated with various computing systems and/or devices that use, send, receive, and/or generate dehazed images based on an input image that is hazy. The haze reduction computing system can include specialized hardware and/or software that enables the performance of one or more operations specific to the disclosed technology.

Furthermore, the haze reduction computing system can include one or more application specific integrated circuits that are configured to perform operations associated with generating feature vectors based on an input image, using machine-learned models to generate haze thickness maps, using a guided filter to refine the haze thickness maps, and generating dehazed images based on input images. By way of example, the haze reduction computing system can be configured to control one or more portions of an image pipeline in which images generated by a sensor are processed for use by a user.

The systems, methods, devices, apparatuses, and tangible non-transitory computer-readable media in the disclosed technology can provide a variety of technical effects and benefits (e.g., technical effects and benefits in the area of image enhancement) including an improvement in the effectiveness of haze reduction in images. The disclosed technology can also improve the accuracy and overall quality of the output of an image processing pipeline by generating haze reduced images that might otherwise be of limited value in their original state. Further, computational resources and network usage can be more effectively used by reducing the number of times that images of an area need to be recaptured, since images with haze that obscures the actual state of a geographic area can have that haze reduced. Additionally, further improvements in the efficiency of computational resource usage can be realized through use of machine-learned models that, once trained, can achieve greater accuracy of generating haze thickness maps in comparison to less efficient techniques in which a great deal of manual input and preparation is required.

The disclosed technology can use various techniques including a combination of using machine-learned models, dark channel information, guided filters, and color correction to achieve improved haze reduced images that preserve fine details of images while removing haze. The novel combination of techniques is particularly useful in reducing haze in satellite images that are used in various mapping applications as well as in areas such as climate research and weather forecasting in which accurate and haze-free imagery can be vital.

Additionally, the techniques employed in the disclosed technology can reduce the number of times that images of a geographic area need to be recaptured due an excessive amount of haze that obscures underlying features of the area. Especially in situations in which capturing an image is expensive, the ability to reduce haze in otherwise less useable images can reduce the number of times an image of the same area has to be recaptured which can result in a reduction in network usage thereby increasing the amount of network resources available for other tasks.

The disclosed technology can more efficiently generate noise reduced images by using machine-learned models, which can allow for a reduction in the number of operations that need to be performed to generate a useable image. The reduction in the number of operations can result in a reduction in the amount of energy that is used to generate the noise reduced image, which can result in more efficient use of computing resources.

As such, the disclosed technology can allow the user of a computing system to more effectively perform the technical task of reducing haze in images. As a result, users are provided with the specific benefits of greater performance and more efficient use of system resources. Further, any of the specific benefits provided to users can be used to improve the effectiveness of a wide variety of devices and services including devices that use machine-learning systems. Accordingly, the improvements offered by the disclosed technology can result in tangible benefits to a variety of devices and/or systems including mechanical, electronic, and computing systems associated with haze reduction.

With reference now to FIGS. 1-10, example embodiments of the present disclosure will be discussed in further detail. FIG. 1 depicts a diagram of an example system according to example embodiments of the present disclosure. The system 100 includes a computing device 102, a computing system 130, a training computing system 150, and one or more remote computing systems 170 that are communicatively connected and/or coupled over a network 180.

The computing device 102 can include one or more processors 112 and a memory 114. The one or more processors 112 can include any suitable processing device (e.g., a processor core, a microprocessor, an application specific integrated circuit (ASIC), a field programmable gate array (FPGA), a controller, and/or a microcontroller) and can be one processor or a plurality of processors that are operatively connected. The memory 114 can include one or more non-transitory computer-readable storage mediums, including RAM, NVRAM, ROM, EEPROM, EPROM, flash memory devices, magnetic disks, and combinations thereof. The memory 114 can store data 116 and instructions 118 which are executed by the processor 112 to cause the computing device 102 to perform one or more operations. In some embodiments, the data 116 can include: data associated with an image (e.g., an input image) that can include a plurality of points (e.g., a plurality of pixels); data associated with a plurality of feature vectors that can correspond to a plurality of feature windows associated with features of different portions of the plurality of points in the input image; data associated with a haze thickness map associated with an estimate of haze thickness at each of the plurality of points of the input image; data associated with a refined haze thickness map that includes a refined estimate of the haze thickness at each of the plurality of points; and data associated with a color corrected dehazed image that is based on the input image. In some embodiments, the computing device 102 can include any of the attributes and/or capabilities of the computing system 130 and can perform one or more operations including any of the operations performed by the computing system 130.

The computing device 102 can be implemented in and/or include any type of computing device, including, for example, a haze reduction device (e.g., a computing device configured to perform any operations described herein including one or more operations associated with determining an amount of haze in various portions of an input image and generating a color corrected and/or dehazed version of the input image), a personal computing device (e.g., laptop computing device or desktop computing device), a mobile computing device (e.g., smartphone or tablet), a controller, a wearable computing device (e.g., a smart watch), and/or an embedded computing device.

Further, the computing device 102 can be configured to perform one or more operations including: generating, based at least in part on an input image including a plurality of points, a plurality of feature vectors corresponding to a plurality of feature windows associated with one or more features of different portions of the plurality of points; generating, based at least in part on the plurality of feature vectors and one or more machine-learned models, a haze thickness map associated with an estimate of haze thickness at each of the plurality of points; generating, based at least in part on the haze thickness map and a guided filter, a refined haze thickness map (in some embodiments, the input image is used as a guidance image for the guided filter); generating, a dehazed image based at least in part on application of the refined haze thickness map to the input image; and generating a color corrected dehazed image based at least in part on performance of one or more color correction operations on the dehazed image.

In some embodiments, the computing device 102 can perform one or more operations associated with generating the plurality of feature vectors including determining, for each point of the plurality of points, a plurality of feature windows including a portion of the plurality of points around each point; determining the one or more features associated with a darkest point in each of the plurality of feature windows; and generating the plurality of feature vectors based at least in part on the one or more features associated with the darkest point in each of the plurality of feature windows. Further, the computing device 102 can perform one or more operations associated with generating the plurality of feature vectors including: determining an image type associated with the input image; and adjusting a size of the plurality of feature windows based at least in part on the image type associated with the input image.

Further, the computing device 102 can perform one or more operations associated with generating a color corrected dehazed image including: reducing color shift in the dehazed image that resulted from use of one or more color correction operations applied to the input image; replacing low-frequency color space components of the dehazed image with low-frequency color space components of the input image; adjusting a white balance of the dehazed image; and/or adjusting one or more colors of the dehazed image based at least in part on conversion of a color space of the dehazed image to a different color space.

In some implementations, the computing device 102 can implement and/or include one or more machine-learned models 120. For example, the one or more machine-learned models 120 can include various machine-learned models including neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks, and/or other forms of neural networks. Examples of the one or more machine-learned models 120 are discussed with reference to FIGS. 1-10.

In some implementations, the one or more machine-learned models 120 can be received from the computing system 130 (e.g., a server computing system) over network 180, stored in the computing device memory 114, and then used or otherwise implemented by the one or more processors 112. In some implementations, the computing device 102 can implement multiple parallel instances of a single machine-learned model of the one or more machine learned models 120 (e.g., to generate and/or determine a haze thickness map for an input image across multiple instances of the machine-learned model 120). More particularly, the one or more machine-learned models 120 can be configured and/or trained to perform any of the operations performed by the computing system 130.

Additionally, or alternatively, one or more machine-learned models 140 can be included in or otherwise stored and implemented by the computing system 130 that communicates with the computing device 102, for example, according to a client-server relationship. For example, the machine-learned models 140 can be implemented by the computing system 130 as a portion of a web service (e.g., an image dehazing service). Thus, one or more machine-learned models 120 can be stored and implemented at the computing device 102 and/or one or more machine-learned models 140 can be stored and implemented at the computing system 130.

The computing device 102 can also include one or more of the user input component 122 that can receive user input. For example, the user input component 122 can be a touch-sensitive component (e.g., a touch-sensitive display screen or a touch pad) that is sensitive to the touch of a user input (e.g., a finger and/or a stylus). The touch-sensitive component can serve to implement a virtual keyboard. Other example user input components include a microphone, a mechanical keyboard, an electromechanical keyboard, and/or other means by which a user can provide user input.

The computing system 130 can include one or more processors 132 and a memory 134. The one or more processors 132 can include any suitable processing device (e.g., a processor core, a microprocessor, an ASIC, a FPGA, a controller, and/or a microcontroller) and can include one processor or a plurality of processors that are operatively connected. The memory 134 can include one or more non-transitory computer-readable storage mediums, including RAM, ROM, EEPROM, EPROM, flash memory devices, magnetic disks, and combinations thereof. The memory 134 can store data 136 and instructions 138 which are executed by the processor 132 to cause the computing system 130 to perform operations. In some embodiments, the data 136 can include: data associated with an image (e.g., an input image) that can include a plurality of points (e.g., a plurality of pixels); data associated with a plurality of feature vectors that can correspond to a plurality of feature windows associated with features of different portions of the plurality of points in the input image; data associated with a haze thickness map associated with an estimate of haze thickness at each of the plurality of points of the input image; data associated with a refined haze thickness map that includes a refined estimate of the haze thickness at each of the plurality of points; and data associated with a color corrected dehazed image that is based on the input image.

Furthermore, in some embodiments, the computing system 130 can be configured to perform the operations of a server computing device including sending and/or receiving data including data associated with one or more images (e.g., input images), one or more haze thickness maps, one or more refined haze thickness maps, one or more dehazed images, and/or one or more color corrected dehazed images, to and/or from one or more computing devices and/or computing systems including the computing device 102, the training computing system 150, and/or the remote computing system 170. In some embodiments, the computing system 130 can include any of the attributes and/or capabilities of the computing device 102 and can perform one or more operations including any of the operations performed by the computing device 102.

Further, the computing system 130 can be implemented in and/or include any type of computing system, including, for example, a haze reduction computing system (e.g., a computing system configured to perform any operations described herein including one or more operations associated with generating haze thickness maps; generating dehazed images; and/or generating color corrected dehazed images), a personal computing device (e.g., laptop computing device or desktop computing device), a mobile computing device (e.g., smartphone or tablet), a server computing system (e.g., a computing system configured to provide data including haze thickness maps, dehazed images, and/or color corrected dehazed images), and/or a controller.

In some implementations, the computing system 130 includes and/or is otherwise implemented by one or more server computing devices. In instances in which the computing system 130 includes plural server computing devices, such server computing devices can operate according to sequential computing architectures, parallel computing architectures, or some combination thereof.

As described above, the computing system 130 can store or otherwise include the one or more machine-learned models 140. For example, the one or more machine-learned models 140 can include various machine-learned models. Example machine-learned models include neural networks or other multi-layer non-linear models. Example neural networks include feed forward neural networks, deep neural networks, recurrent neural networks, and convolutional neural networks. Examples of the one or more machine-learned models 140 are discussed with reference to FIGS. 1-10.

The computing device 102 and/or the computing system 130 can train the one or more machine-learned models 120 and/or 140 via interaction with the training computing system 150 that is communicatively connected and/or coupled over the network 180. The training computing system 150 can be separate from the computing system 130 or can be a portion of the computing system 130.

The training computing system 150 includes one or more processors 152 and a memory 154. The one or more processors 152 can be any suitable processing device (e.g., a processor core, a microprocessor, an ASIC, a FPGA, a controller, and/or a microcontroller) and can be one processor or a plurality of processors that are operatively connected. The memory 154 can include one or more non-transitory computer-readable storage mediums, including RAM, ROM, EEPROM, EPROM, flash memory devices, magnetic disks, and combinations thereof. The memory 154 can store data 156 and instructions 158 which are executed by the processor 152 to cause the training computing system 150 to perform operations. In some embodiments, the data 156 can include: data associated with an image (e.g., an input image) that can include a plurality of points (e.g., a plurality of pixels); data associated with a plurality of feature vectors that can correspond to a plurality of feature windows associated with features of different portions of the plurality of points in the input image; data associated with a haze thickness map associated with an estimate of haze thickness at each of the plurality of points of the input image; data associated with a refined haze thickness map that includes a refined estimate of the haze thickness at each of the plurality of points; and data associated with a color corrected dehazed image that is based on the input image. In some implementations, the training computing system 150 includes or is otherwise implemented by one or more server computing devices.

The training computing system 150 can include a model trainer 160 that trains the one or more machine-learned models 120 and/or the one or more machine-learned models 140 respectively stored at the computing device 102 and/or the computing system 130 using various training or learning techniques, including, for example, backwards propagation of errors. In some implementations, performing backwards propagation of errors can include performing truncated backpropagation through time. The model trainer 160 can perform a number of generalization techniques (e.g., weight decays and/or dropouts) to improve the generalization capability of the models being trained.

In particular, the model trainer 160 can train the one or more machine-learned models 120 and/or the one or more machine-learned models 140 based on a set of training data 162. The training data 162 can include: data associated with an image (e.g., an input image) that can include a plurality of points (e.g., a plurality of pixels); data associated with a plurality of feature vectors that can correspond to a plurality of feature windows associated with features of different portions of the plurality of points in the input image; data associated with a haze thickness map associated with an estimate of haze thickness at each of the plurality of points of the input image; data associated with a refined haze thickness map that includes a refined estimate of the haze thickness at each of the plurality of points; and data associated with a color corrected dehazed image that is based on the input image. The one or more machine-learned models 120 and/or the one or more machine-learned models 140 can be configured and/or trained to perform any of the one or more operations performed by the computing device 102 and/or the computing system 130. For example, the one or more machine-learned models 120 can be configured and/or trained to perform various operations including: generating, based at least in part on an input image including a plurality of points, a plurality of feature vectors corresponding to a plurality of feature windows associated with one or more features of different portions of the plurality of points; generating, based at least in part on the plurality of feature vectors and one or more machine-learned models, a haze thickness map associated with an estimate of haze thickness at each of the plurality of points; generating, based at least in part on the haze thickness map and a guided filter, a refined haze thickness map (in some embodiments, the input image is used as a guidance image for the guided filter); generating, a dehazed image based at least in part on application of the refined haze thickness map to the input image; and generating a color corrected dehazed image based at least in part on performance of one or more color correction operations on the dehazed image.

In some implementations, if the user has provided consent, the training examples can be provided by the computing device 102. Thus, in such implementations, the one or more machine-learned models 120 provided to the computing device 102 can be trained by the training computing system 150 based at least in part on user-specific data received from the computing device 102 including: images captured using an image capture device associated with the computing device 102 including the associated latitudes, longitudes, and/or altitudes associated with the respective images.

The model trainer 160 can include computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium including RAM hard disk or optical or magnetic media.

Each of the one or more remote computing systems 170 can include one or more processors 172 and a memory 174. The one or more processors 172 can include any suitable processing device (e.g., a processor core, a microprocessor, an ASIC, a FPGA, a controller, and/or a microcontroller) and can include one processor or a plurality of processors that are operatively connected. The memory 174 can include one or more non-transitory computer-readable storage mediums, including RAM, ROM, EEPROM, EPROM, flash memory devices, magnetic disks, and combinations thereof. The memory 174 can store data 176 and instructions 178 which are executed by the processor 172 to cause the remote computing system 170 to perform operations.

In some implementations, the one or more remote computing systems 170 include or are otherwise implemented by one or more computing devices. In instances in which the one or more remote computing systems 170 includes plural computing devices, such computing devices can operate according to sequential computing architectures, parallel computing architectures, and/or some combination thereof. Furthermore, the one or more remote computing systems 170 can be used to collect, generate, send, and or receive one or more signals and/or data including image data which can be used as a basis for one or more input images. The one or more remote computing systems 170 can include a smart phone device that a user of the smart phone device can use to capture images of locations through which the user associated with the one or more remote computing systems 170 travels.

In some embodiments, any user provided data can be strongly encrypted, anonymized (e.g., any personal information or other information associated with the user's identity is either not collected or is deleted after being received), and maintained in a secure and privacy enhancing way for use by the one or more remote computing systems 170 which can provide the data for use by other computing devices and/or systems including those described herein.

The network 180 can include any type of communications network, including a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other computing systems can be used as well. For example, in some implementations, the computing device 102 and/or the computing system 130 can include the model trainer 160 and the training data 162. In such implementations, the one or more machine-learned models 120 can be both trained and used locally at the computing device 102 and/or the computing system 130. In some such implementations, the computing device 102 and/or the computing system 130 can implement the model trainer 160 to personalize the one or more machine-learned models 120 based on user-specific data.

Figure 2:
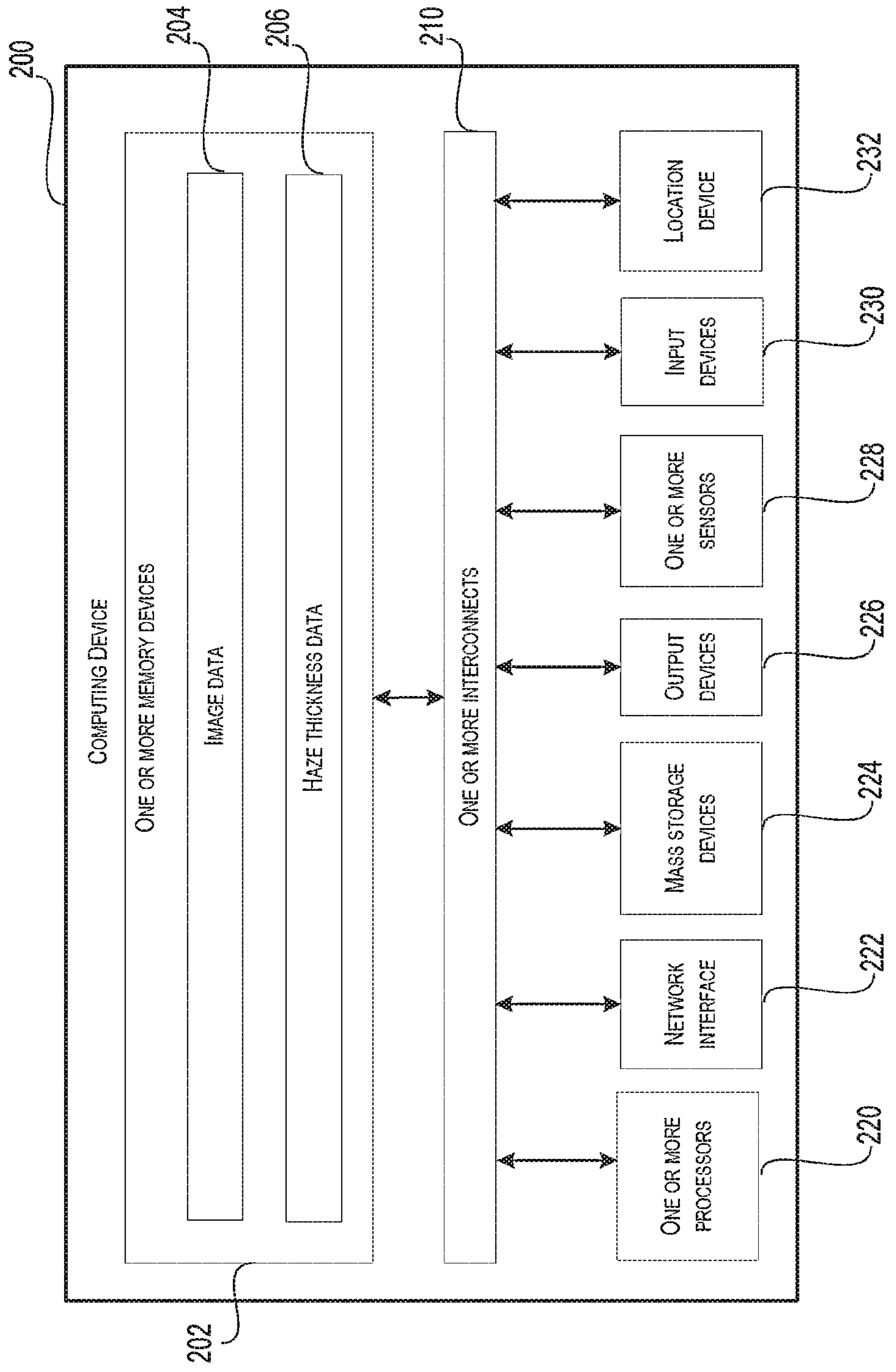
FIG. 2 depicts a diagram of an example device according to example embodiments of the present disclosure.

FIG. 2 depicts a diagram of an example device according to example embodiments of the present disclosure. A computing device 200 can include one or more attributes and/or capabilities of the computing device 102, the computing system 130, the training computing system 150, and/or the one or more remote computing systems 170. Furthermore, the computing device 200 can perform one or more actions and/or operations including the one or more actions and/or operations performed by the computing device 102, the computing system 130, the training computing system 150, and/or the one or more remote computing systems 170, which are depicted in FIG. 1.

As shown in FIG. 2, the computing device 200 can include one or more memory devices 202, image data 204, haze thickness data 206, one or more interconnects 210, one or more processors 220, a network interface 222, one or more mass storage devices 224, one or more output devices 226, one or more sensors 228, one or more input devices 230, and/or the location device 232.

The one or more memory devices 202 can store information and/or data (e.g., the image data 204, the haze thickness map data 206, and/or the aggregated travel data 208). Further, the one or more memory devices 202 can include one or more non-transitory computer-readable storage mediums, including RAM, ROM, EEPROM, EPROM, flash memory devices, magnetic disks, and combinations thereof. The information and/or data stored by the one or more memory devices 202 can be executed by the one or more processors 220 to cause the computing device 200 to perform operations.

The image data 204 can include one or more portions of data (e.g., the data 116, the data 136, the data 156, and/or the data 176 which are depicted in FIG. 1) and/or instructions (e.g., the instructions 118, the instructions 138, the instructions 158, and/or the instructions 178 which are depicted in FIG. 1) that are stored in the memory 114, the memory 134, the memory 154, and/or the memory 174 respectively. Furthermore, the image data 204 can include information associated with one or more images (e.g., an input image); feature vectors associated with the one or more images; and/or feature windows associated with the one or more images.

The haze thickness data 206 can include one or more portions of the data 116, the data 136, the data 156, and/or the data 176 which are depicted in FIG. 1 and/or instructions (e.g., the instructions 118, the instructions 138, the instructions 158, and/or the instructions 178 which are depicted in FIG. 1) that are stored in the memory 114, the memory 134, the memory 154, and/or the memory 174 respectively. Furthermore, the haze thickness data 206 can include information associated with one or more machine-learned models configured and/or trained to perform one or more operations associated with estimating haze thickness in one or more images.

The one or more interconnects 210 can include one or more interconnects or buses that can be used to send and/or receive one or more signals (e.g., electronic signals) and/or data (e.g., the image data 204 and/or the haze thickness data 206) between components of the computing device 200, including the one or more memory devices 202, the one or more processors 220, the network interface 222, the one or more mass storage devices 224, the one or more output devices 226, the one or more sensors 228 (e.g., a sensor array), and/or the one or more input devices 230. The one or more interconnects 210 can be arranged or configured in different ways including as parallel or serial connections. Further the one or more interconnects 210 can include one or more internal buses to connect the internal components of the computing device 200; and one or more external buses used to connect the internal components of the computing device 200 to one or more external devices. By way of example, the one or more interconnects 210 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the image data 204 and/or the haze thickness data 206. The one or more processors 220 can include single or multiple core devices including a microprocessor, microcontroller, integrated circuit, and/or logic device.

The network interface 222 can support network communications. For example, the network interface 222 can support communication via networks including a local area network and/or a wide area network (e.g., the Internet). The one or more mass storage devices 224 (e.g., a hard disk drive and/or a solid state drive) can be used to store data including the image data 204 and/or the haze thickness data 206. The one or more output devices 226 can include one or more display devices (e.g., LCD display, OLED display, and/or CRT display), one or more light sources (e.g., LEDs), one or more loud speakers, and/or one or more haptic output devices.

The one or more input devices 230 can include one or more keyboards, one or more touch sensitive devices (e.g., a touch screen display), one or more buttons (e.g., ON/OFF buttons and/or YES/NO buttons), one or more microphones, and/or one or more cameras.

The one or more memory devices 202 and the one or more mass storage devices 224 are illustrated separately, however, the one or more memory devices 202 and the one or more mass storage devices 224 can be regions within the same memory module. The computing device 200 can include one or more additional processors, memory devices, network interfaces, which may be provided separately or on a same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. The one or more memory devices 202 can be used to operate various applications including a mobile operating system developed specifically for mobile devices. As such, the one or more memory devices 202 can store instructions that allow the software applications to access data including wireless network parameters (e.g., identity of the wireless network, quality of service), and invoke various services including telephony, location determination (e.g., via global positioning system (GPS) or WLAN), and/or wireless network data call origination services. In other embodiments, the one or more memory devices 202 can be used to operate or execute a general-purpose operating system that operates on both mobile and stationary devices, such as smartphones and desktop computers, for example.

The software applications that can be operated or executed by the computing device 200 can include applications associate with the system 100 shown in FIG. 1. Further, the software applications that can be operated and/or executed by the computing device 200 can include native applications and/or web-based applications.

The location device 232 can include one or more devices or circuitry for determining the position of the computing device 200. For example, the location device 232 can determine an actual and/or relative position of the computing device 200 by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, beacons, and the like and/or other suitable techniques for determining position.

Figure 3:
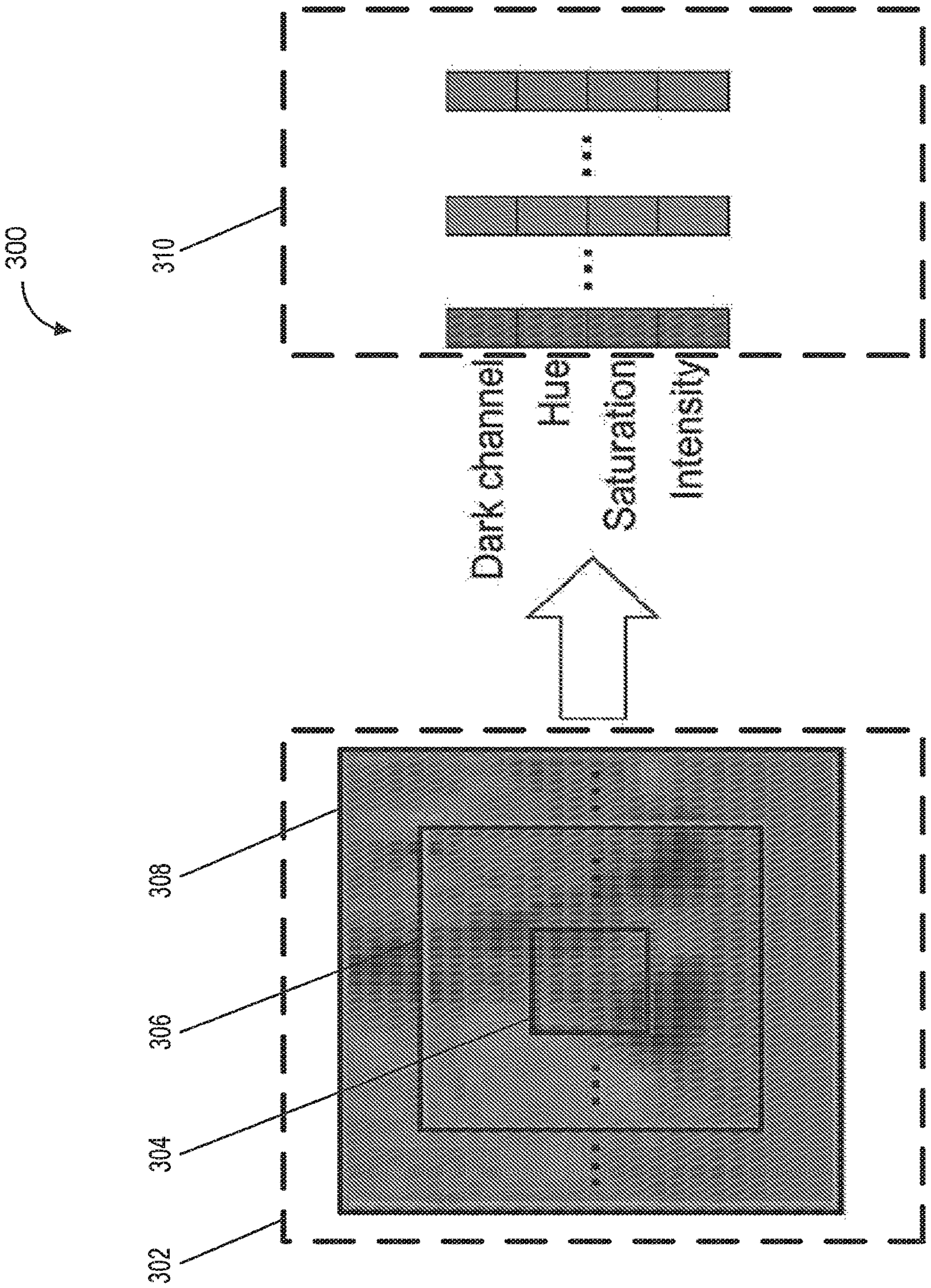
FIG. 3 depicts an example of feature extraction as part of a haze reduction technique according to example embodiments of the present disclosure.

FIG. 3 depicts an example of feature extraction as part of a haze reduction technique according to example embodiments of the present disclosure. Any operations and/or actions performed as part of the technique 300 can be performed by a computing device and/or computing system that includes one or more attributes and/or capabilities of the computing device 102, the computing system 130, the training computing system 150, and/or the one or more remote computing systems 170. As shown in FIG. 3, the technique 300 includes a plurality of feature windows 302, a feature window 304, a feature window 306, a feature window 308, and features 310.

In this example, the plurality of feature windows 302 includes the feature window 304, the feature window 306, and the feature window 308. Each of the plurality of feature windows 302 can include a plurality of points (e.g., a plurality of pixels) that represent a portion of an associated image (e.g., an input image). As part of the technique 300, the size of each of the plurality of feature windows 302 can be a different size. Further, a feature window can be nested within another feature window and/or have another feature nested inside of it.

In some embodiments, there can be a trade-off between the bias and variance of a haze estimation that can be associated with a size of a feature window. For example, a larger feature window can result in a lower estimation variance and a larger bias which can be due to the haze thickness being significantly different over the region encompassed by a feature window. By way of further example, a smaller feature window can result in a greater estimation variance and a smaller bias which can be due to the smaller differences in haze thickness over the smaller region encompassed by a feature window.

In some embodiments, the size of a feature window can be adaptive based at least in part on the image content (e.g., the image content in an input image). For example, the size of a feature window can be based at least in part on information (e.g., metadata associated with an input image) that indicates the type of content within an image. Certain feature window sizes can be associated with certain types of content, which can then be used when a particular type of content is determined to be associated with an input image. Further, in some embodiments, the feature window size can be a default size that is defaulted to when the type of content or a desired feature window size is not specified.

The technique 300 can include using an input image that includes a plurality of pixels and, for each of the plurality of pixels, using multiple feature windows (e.g., the plurality of feature windows 302) with a plurality of different sizes. For example, the feature window 304 (the smallest feature window) can be square shaped and have a width of seven (7) pixels, the feature window 306 (the intermediate sized feature window) can be square shaped and have a width of twenty-one (21) pixels, and the feature window 308 (the largest sized feature window) can be square shaped and have a width of thirty-one (31) pixels. Further, in some embodiments, each of the plurality of feature windows associated with a pixel can be centered at that same given pixel. Additionally, for each of the plurality of feature windows, features (e.g., the features 310) of the dark pixel in the feature window can be determined. The features of the dark pixel can include the hue, saturation, luminance intensity and the smallest channel value of the dark pixel. Further, the feature values associated with each of the plurality of feature windows can be formed into a single vector as the feature vector of the center pixel. The operations of the technique 300 can be repeated for each pixel in an image until a plurality of feature vectors is generated for the entire image.

Figure 4:
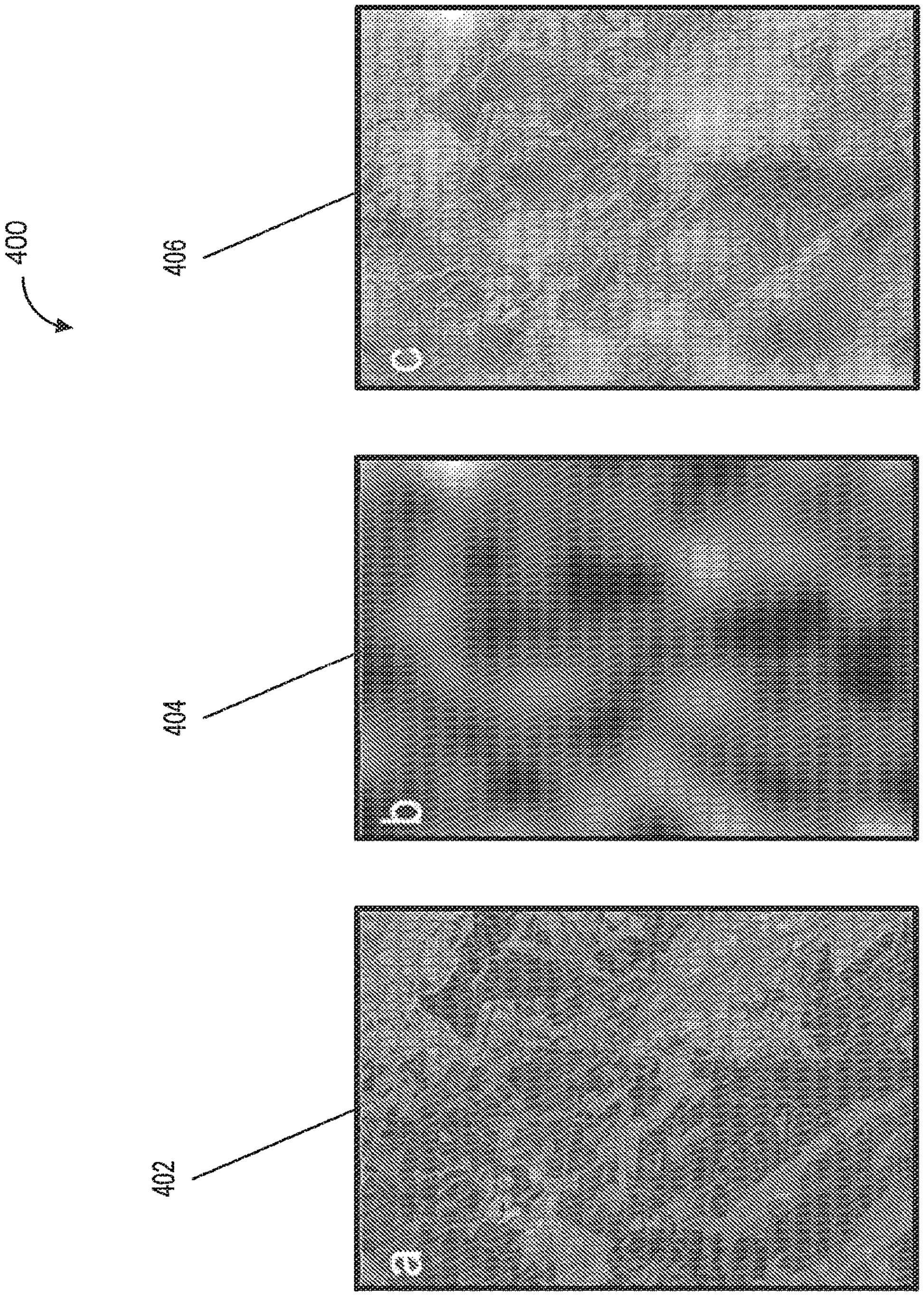
FIG. 4 depicts an example of training a machine-learning model to perform a haze reduction technique according to example embodiments of the present disclosure.

FIG. 4 depicts an example of training a machine-learning model to perform a haze reduction technique according to example embodiments of the present disclosure. Any operations and/or actions performed as part of the technique 400 can be performed by a computing device and/or computing system that includes one or more attributes and/or capabilities of the computing device 102, the computing system 130, the training computing system 150, and/or the one or more remote computing systems 170. As shown in FIG. 4, the technique 400 includes an input image 402, a haze thickness map 404, and a simulated hazy image 404.

The input image 402 can include an image (e.g., an RGB image) that can be used as an input to a machine-learned model. By way of example, the input image 402 can be a satellite image that is free from haze. The haze thickness map 404 can be a simulated haze thickness map that can be generated based on any technique that can be used to produce a spatially varying haze map. Further, the haze thickness map 404 can be one of a plurality of different haze thickness maps. The haze thickness map 404 can then be applied to the input image 402 to generate the simulated hazy image 406.

Further, the simulated hazy image 406 can be used to generate a plurality of feature vectors that are associated with one or more features of the simulated hazy image 406. The plurality of feature vectors that were generated based on the simulated hazy image 406 can then be provided as an input to one or more machine-learned models (not shown) that have been configured and/or trained to generate an output including a haze thickness map that can be compared to the haze thickness map 404 to train the one or more machine-learned models as part of a training process that can include a gradient descent approach. For example, the training process can include minimization of a loss associated with a loss function that includes one or more parameters. Adjusting the weighting of the one or more parameters can reduce the difference between the haze thickness map generated as output and the ground-truth haze thickness map that was used to generate the simulated hazy image that was provided as input. As such, the simulated hazy image 406 and the haze thickness map 404 can be used as a respective training input and ground-truth output to train the one or more machine-learned models.

In this example, the one or more machine-learned models can include a Multi-layer perceptron, though other types of machine-learning models can be used in other embodiments. Further, the simulated hazy image 404 can be used as one of the plurality of simulated hazy images to train the one or more machine-learned models. A greater number of simulated hazy images and/or different varieties of simulated hazy images (e.g., simulated hazy images that include different haze thicknesses and/or different types of input images) can be used to further improve the accuracy of the one or more machine-learned models.

Figure 5:
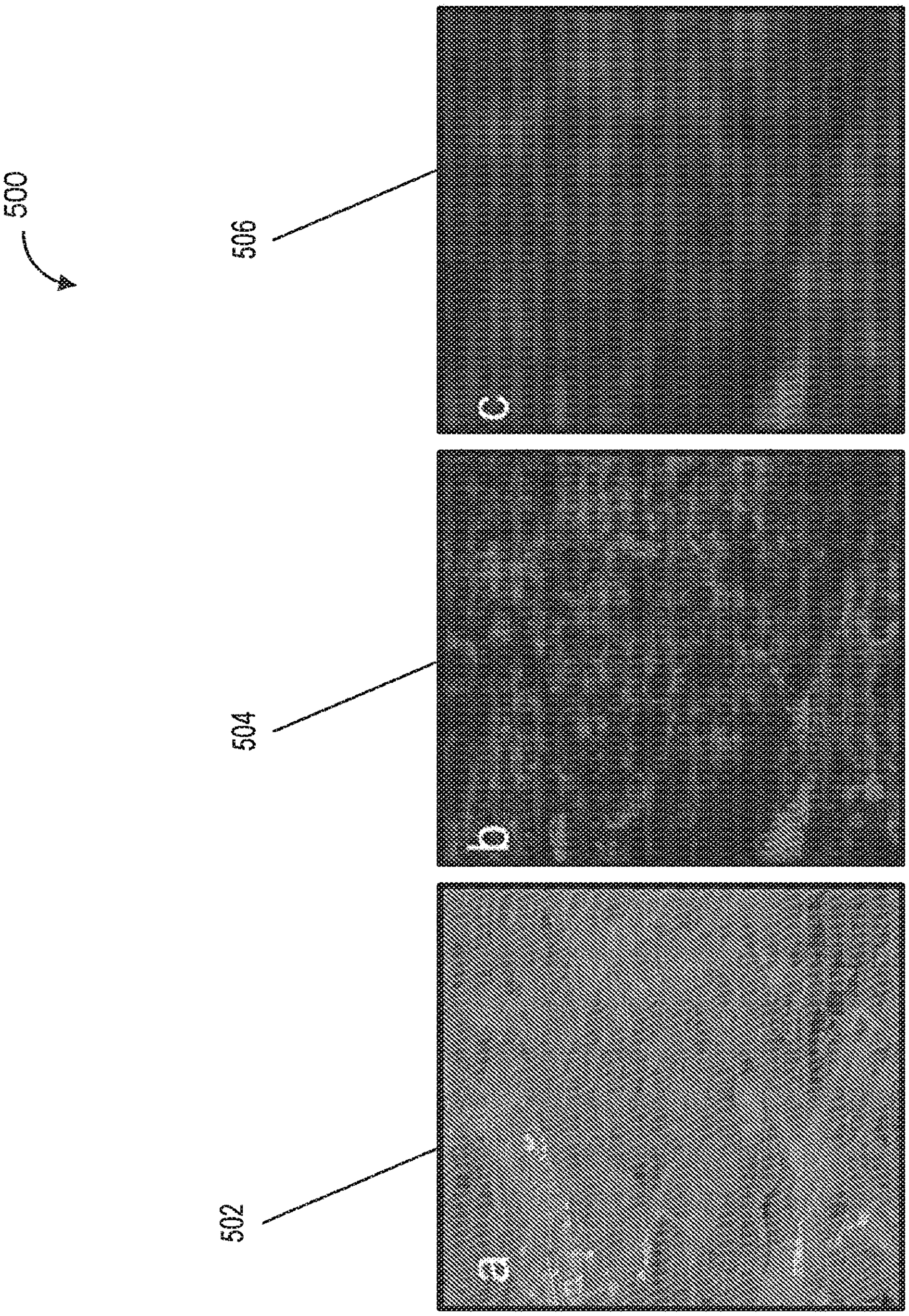
FIG. 5 depicts an example of a haze reduction technique including generation of a haze map according to example embodiments of the present disclosure.

FIG. 5 depicts an example of a haze reduction technique including generation of a haze map according to example embodiments of the present disclosure. Any operations and/or actions performed as part of the technique 500 can be performed by a computing device and/or computing system that includes one or more attributes and/or capabilities of the computing device 102, the computing system 130, the training computing system 150, and/or the one or more remote computing systems 170. As shown in FIG. 5, the technique 500 includes an input image 502, a haze thickness map 504, and a refined haze thickness map 506.

The input image 502 can include an image provided as an input to one or more machine-learned models that were configured and/or trained to receive a plurality of feature vectors associated with the image and generate a haze thickness map associated with an estimated haze at each of a plurality of points (e.g., pixels) of the image. The haze thickness map 504 can include a haze thickness map generated by the one or more machine-learned models. A computing system (e.g., the computing system 130 that is depicted in FIG. 1) can perform one or more operations on the haze thickness map including applying a guided filter to refine the haze thickness map 504. In some embodiments, the input image 502 can be used as the filter guidance for the guided filter. For example, the guided filter can include a combination of a linear filter in which smoothing of the thickness map 504 is based at least in part on use of neighboring points (e.g., pixels) as well as the use of the content of the input image 502 (the filter guidance) to perform the filtration.

Figure 6:
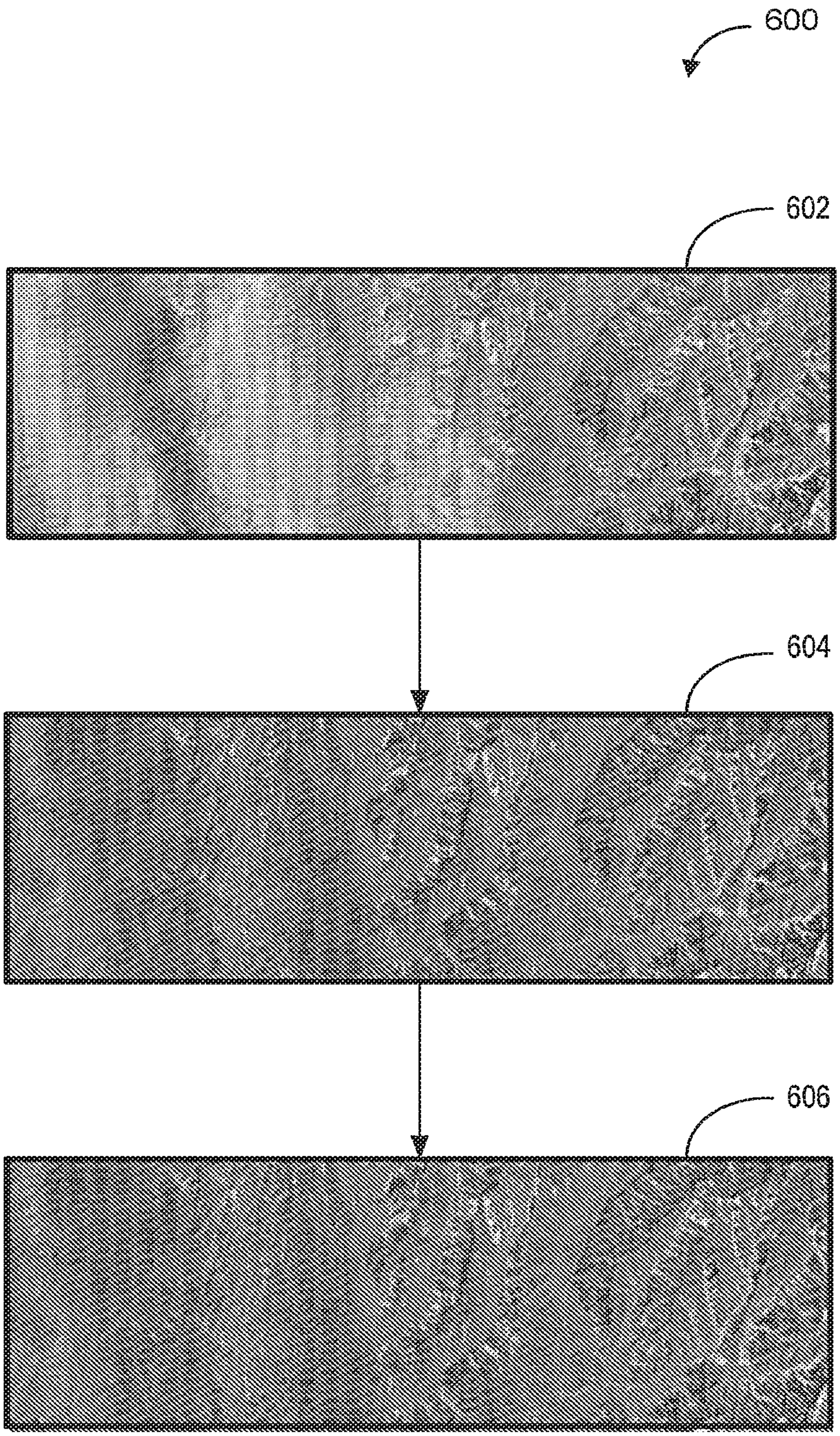
FIG. 6 depicts an example of a haze reduction technique including color correction according to example embodiments of the present disclosure.

FIG. 6 depicts an example of a haze reduction technique including color correction according to example embodiments of the present disclosure. Any operations and/or actions performed as part of the technique 600 (depicted in FIG. 6) can be performed by a computing device and/or computing system that includes one or more attributes and/or capabilities of the computing device 102, the computing system 130, the training computing system 150, and/or the one or more remote computing systems 170. As shown in FIG. 6, the technique 600 includes a hazy image 602, a dehazed image 604, and a color corrected dehazed image 606.

The technique 600 can be performed on the dehazed image 604 that was generated based at least in part on application of a haze thickness map to the hazy image 602. In some embodiments, the dehazed image 604 can be generated based in part on one or more operations performed by one or more machine-learned models (e.g., the one or more machine-learned models 140 that are depicted in FIG.

1) on the hazy image 602 that included haze that obscured one or more portions of the hazy image 602. Following dehazing of the hazy image 602, the resulting dehazed image 604 can include one or more color artifacts. The color artifacts in the dehazed image 604 can be the result of portions of the dehazed image 604 that are obscured by thick haze (e.g., haze with a thickness that exceeds a predetermined threshold thickness) that becomes blue after dehazing. The color shift resulting from the dehazing of the hazy image 602 can be due to an assumption that haze thickness is the same over RGB channels of the hazy image 602. The scattering ratio of light through the atmosphere of an environment can vary over spectrum, as such the actual haze thickness can also vary over RGB channels of an image of the environment. This variation can result in color shift in the haze reduction operations that produce the dehazed image 604 and can be especially prominent in the one or more portions of the hazy image 602 in which regions the haze was particularly thick. Accordingly, one or more color correction operations can be performed on the dehazed image 604 in order to generate the color corrected dehazed image 606.

In some embodiments, one or more color correction operations can be performed on the hazy image 602 including conversion of the input hazy image 602 and the dehazed image 604 from an RGB color space to a YUV color space. Further, the one or more color correction operations can include taking the UV channels of the dehazed image 604 and replacing their low-frequency components in Fourier domain with the low-frequency components from the hazy image 602's UV channels. Furthermore, the one or more color correction operations can include conversion of the updated YUV of the dehazed image 604 back to the RGB color space. The one or more color correction operations can result in reduction or removal of color shift that can result from generating the dehazed image 604.

Figure 7:
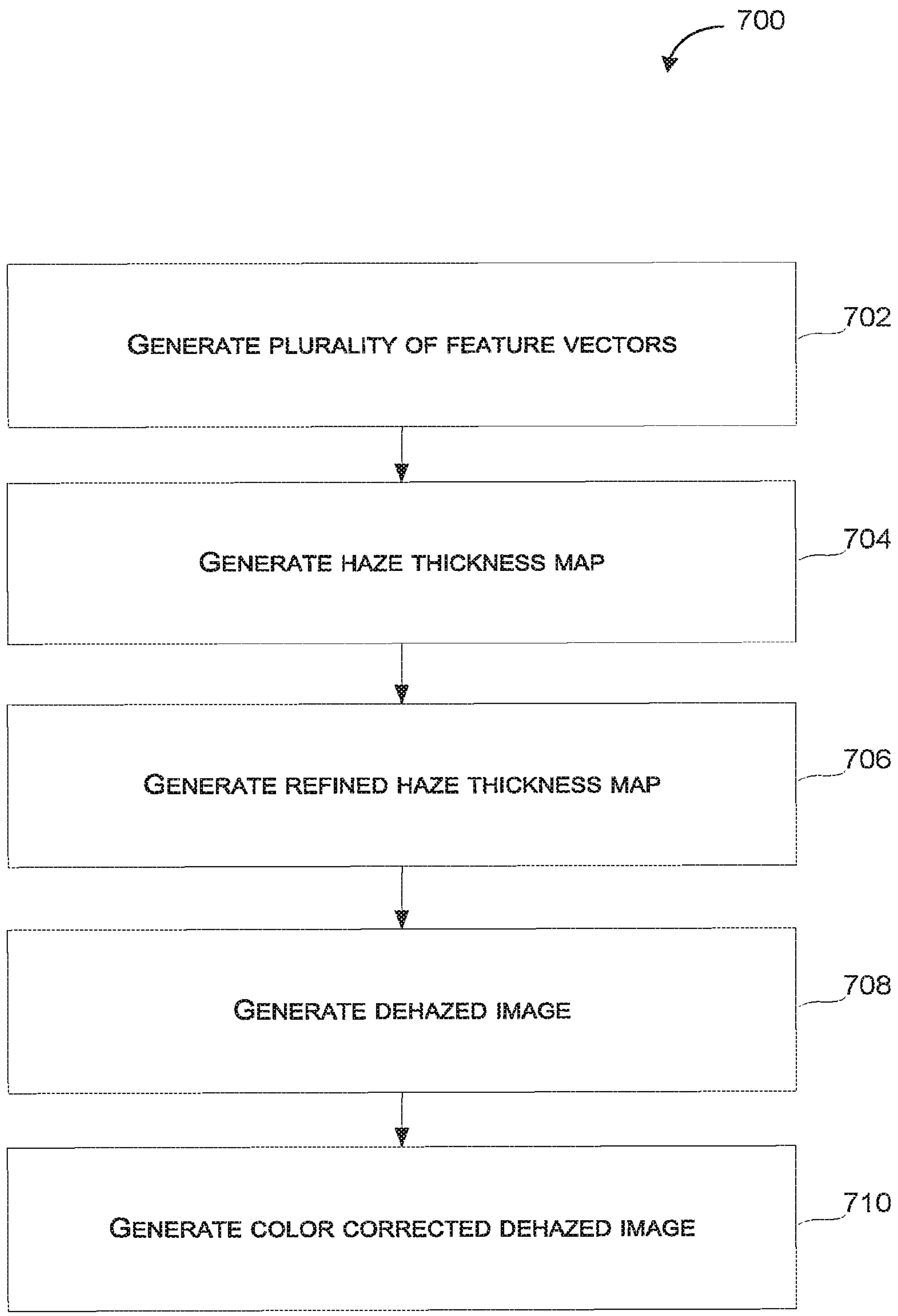
FIG. 7 depicts a flow diagram of performing haze reduction operations according to example embodiments of the present disclosure.

FIG. 7 depicts a flow diagram of performing haze reduction operations according to example embodiments of the present disclosure according to example embodiments of the present disclosure. One or more portions of the method 700 can be executed and/or implemented on one or more computing devices or computing systems including, for example, the computing device 102, the computing system 130, the training computing system 150, and/or the remote computing system 170. Further, one or more portions of the method 700 can be executed or implemented as an algorithm on the hardware devices or systems disclosed herein. FIG. 7 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 702, the method 700 can include generating a plurality of feature vectors. Generation of the plurality of feature vectors can be based at least in part on an input image that includes a plurality of points. The input image can be an image that is hazy and/or noisy (e.g., a satellite image in which a portion of the visual features of the ground are obscured by clouds). Further, the plurality of feature vectors can be associated with and/or correspond to a plurality of feature windows. The plurality of feature windows can be based at least in part on or associated with, one or more features of different portions of the plurality of points.

By way of example, the computing system 130 can receive, obtain, and/or retrieve data and/or information associated with an input image that includes a plurality of pixels. The data and/or information associated with the input image can include the color space information associated with each of the plurality of pixels. The computing system 130 can then perform one or more operations on the input image to determine the plurality of feature vectors. In particular, the computing system 130 can determine the RGB color channel values associated with each of the plurality of pixels. Further, the computing system 130 can analyze the pixels in each of a plurality of feature windows of some predetermined size to determine the features in each feature window. The computing system 130 can then use the features of each of the plurality of feature windows to generate the plurality of feature vectors which can be formatted for use by one or more machine-learned models.

In some embodiments, the input image can include an image that is encoded in a raster (e.g., bitmap), voxel, or vector image format. Further, the input image can be associated with a color space that defines the colors in the input image and which can be represented by a color model. For example, the color model or color space associated with the input image can include RGB, CMYK, and/or HSL/HSV. In some embodiments, the input image can be based at least in part on video that includes the input image. For example, the input image can be extracted from a plurality of sequential input images of a video.

At 704, the method 700 can include generating a haze thickness map. Generation of the haze thickness map can be based at least in part on the plurality of feature vectors and/or one or more machine-learned models. For example, the plurality of feature vectors can be provided as an input to the one or more machine-learned models which have been configured and/or trained to generate the haze thickness map based at least in part on the input plurality of feature vectors. The haze thickness map can be associated with an estimate of haze thickness at each of the plurality of points. Further, the one or more machine-learned models can be configured to perform one or more operations that include estimation of haze thickness associated with the one or more features. By way of example, the one or more machine-learned models 140 of the computing system 130 can receive data and/or information associated with an input comprising the plurality of feature vectors. The one or more machine-learned models can then generate the haze thickness map based at least in part on the input comprising the plurality of feature vectors. The haze thickness map generated by the one or more machine-learned models 140 can indicate an estimated haze thickness for each of the plurality of points in the input image associated with the plurality of feature vectors.

At 706, the method 700 can include generating a refined haze thickness map. Generation of the refined haze thickness map can be based at least in part on the haze thickness map and/or a guided filter. For example, the computing system 130 can use a guided filter on the haze thickness map to generate a refined haze thickness map. In some embodiments, the computing system 130 can use the input image as a guidance image for the guided filter, thereby using the content of the input image to guide filtering of the refined haze thickness map. Furthermore, the refined haze thickness map can indicate an estimated haze thickness for each of the plurality of points in the input image associated with the plurality of feature vectors.

At 708, the method 700 can include generating a dehazed image. Generation of the dehazed image can be based at least in part on application of the refined haze thickness map to the input image. For example, the computing system 130 can generate the dehazed image by performing one or more operations in which the input image is dehazed by applying the refined haze thickness map to the input image. Applying the refined haze thickness map to the input image can include applying the estimated haze thickness of each of the plurality of points represented in the refined haze thickness map to the corresponding plurality of points in the input image. The dehazed image can include the result of applying the refined haze thickness map to the input image.

In some embodiments, the one or more operations to dehaze the input image can include performed by the computing system 130 can include use of the dehazing function (e.g., $J(x)=(Y(x)-A*t(x))/(1-t(x))$ described herein) on the input image.

At 710, the method 700 can include generating a color corrected dehazed image. Generation of the color corrected dehazed image can be based at least in part on performance of one or more color correction operations on the dehazed image. For example, the computing system 130 can perform one or more color correction operations on the data and/or information associated with the dehazed image. The one or more color correction operations performed by the computing system 130 can include analysis of each of the plurality of pixels in the dehazed image and adjustment of the hue, saturation, and/or brightness of each of the plurality of pixels in the dehazed image. Further, the adjustment of the plurality of pixels in the dehazed images computing system 130 can include adjusting a hue, a saturation, and/or an intensity/brightness of each of the plurality of pixels in the dehazed image to conform to a desired range of brightness in the input image.

Figure 8:
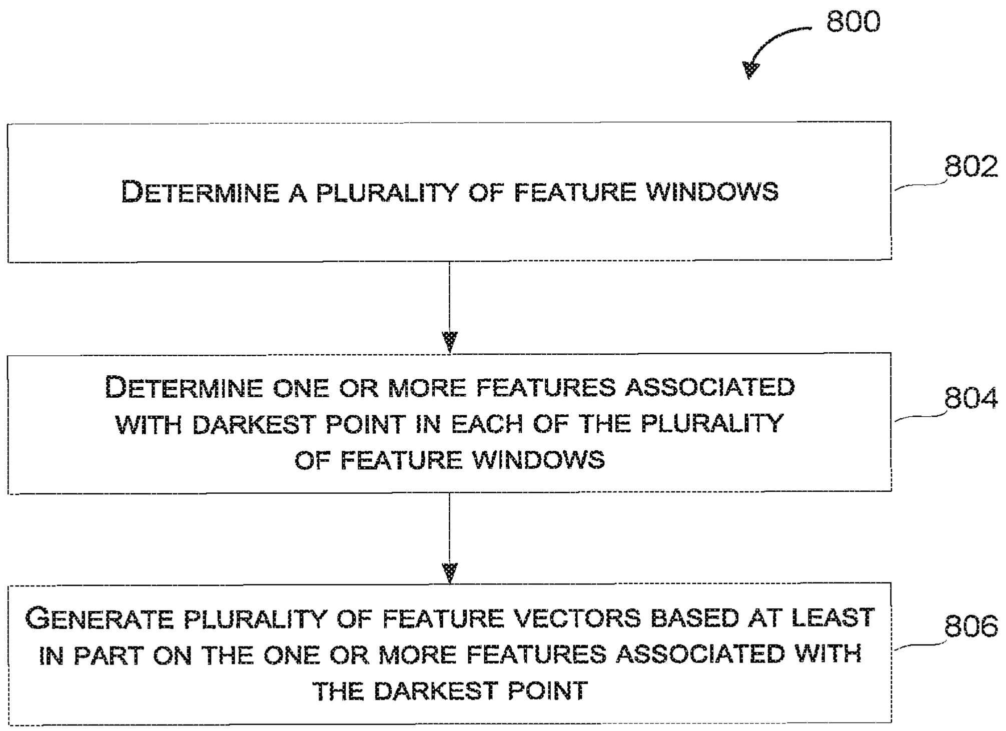
FIG. 8 depicts a flow diagram of performing haze reduction operations according to example embodiments of the present disclosure.

FIG. 8 depicts a flow diagram of performing haze reduction operations according to example embodiments of the present disclosure according to example embodiments of the present disclosure. One or more portions of the method 800 can be executed and/or implemented on one or more computing devices or computing systems including, for example, the computing device 102, the computing system 130, the training computing system 150, and/or the remote computing system 170. Further, one or more portions of the method 800 can be executed or implemented as an algorithm on the hardware devices or systems disclosed herein. In some embodiments, one or more portions of the method 800 can be performed as part of the method 700 that is depicted in FIG. 7. FIG. 8 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 802, the method 800 can include determining and/or generating a plurality of feature windows for each point of the plurality of points. Each feature window of the plurality of feature windows can include a portion of the plurality of points around each point. For example, the computing system 130 can determine and/or generate a plurality of feature windows that are square with sides that are twenty-one points per side. Each feature window of the plurality of feature windows determined and/or generated by the computing system 130 can include data and/or information associated with the features (e.g., hue, saturation, and/or intensity/brightness) of the plurality of points within the feature window.

At 804, the method 800 can include determining the one or more features associated with a darkest point in each of the plurality of feature windows. For example, the computing system 130 can analyze each of the plurality of points within each of the plurality of feature windows to determine the point in each of the plurality of feature windows that satisfies some criteria associated with being the darkest point in that feature window. For example, the computing system 130 can compare the plurality of points in a feature window to one another in order to determine the point that is darkest. In some embodiments, darkness can be based at least in part on the intensity/brightness of each of a point such that the point with the lowest intensity/brightness is the darkest point.

At 806, the method 800 can include generating and/or determining the plurality of feature vectors based at least in part on the one or more features associated with the darkest point in each of the plurality of feature windows. For example, the computing system 130 can generate the plurality of feature vectors that include data and/or information associated with the features (e.g., hue, saturation, and/or intensity/brightness) of the darkest point (e.g., pixel) in each of the plurality of feature windows.

Figure 9:
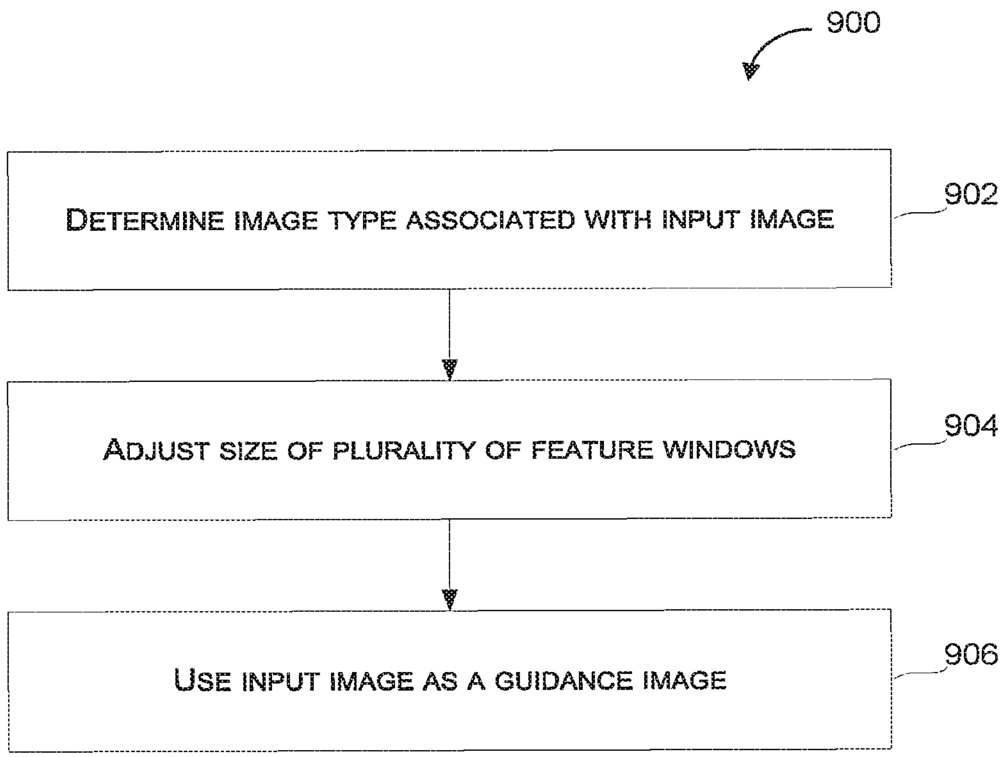
FIG. 9 depicts a flow diagram of performing haze reduction operations according to example embodiments of the present disclosure.

FIG. 9 depicts a flow diagram of performing haze reduction operations according to example embodiments of the present disclosure according to example embodiments of the present disclosure. One or more portions of the method 900 can be executed and/or implemented on one or more computing devices or computing systems including, for example, the computing device 102, the computing system 130, the training computing system 150, and/or the remote computing system 170. In some embodiments, one or more portions of the method 900 can be performed as part of the method 700 that is depicted in FIG. 7. Further, one or more portions of the method 900 can be executed or implemented as an algorithm on the hardware devices or systems disclosed herein. FIG. 9 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 902, the method 900 can include determining an image type and/or image content associated with the input image. The image type can be based at least in part on content depicted in the input image. For example, the computing system 130 can perform one or more operations associated with determining the distribution (e.g., statistical distribution) and/or type of one or more features in the input image. The distribution and/or type of features in the input image can include one or more spatial and/or one or more color features.

At 904, the method 900 can include adjusting a size of the plurality of feature windows based at least in part on the image type associated with the input image. Certain distributions and/or types of features can be associated with corresponding image types. Further, each of the corresponding image types can be associated with one or more feature window sizes and/or a range of feature window sizes. Based at least in part on the image type and/or image content associated with the input image, the computing system 130 can perform one or more operations to change the size (e.g., a size in terms of an amount of points in a feature window and/or dimensions of a feature window) of a feature window to match the corresponding feature window size.

At 906, the method 900 can include using the input image as a guidance image for the guided filter. For example, the computing system 130 can use the input image as a guidance image for the guided filtering operations in which the refined haze thickness map is generated based at least in part on the use of the haze thickness map and the guided filter. Use of the input image as a guidance image for the guided filtering operations can include the computing system 130 using the portions of points of the input image that correspond to the portions of points in the haze map as guidance for generation of the refined haze thickness map.

Figure 10:
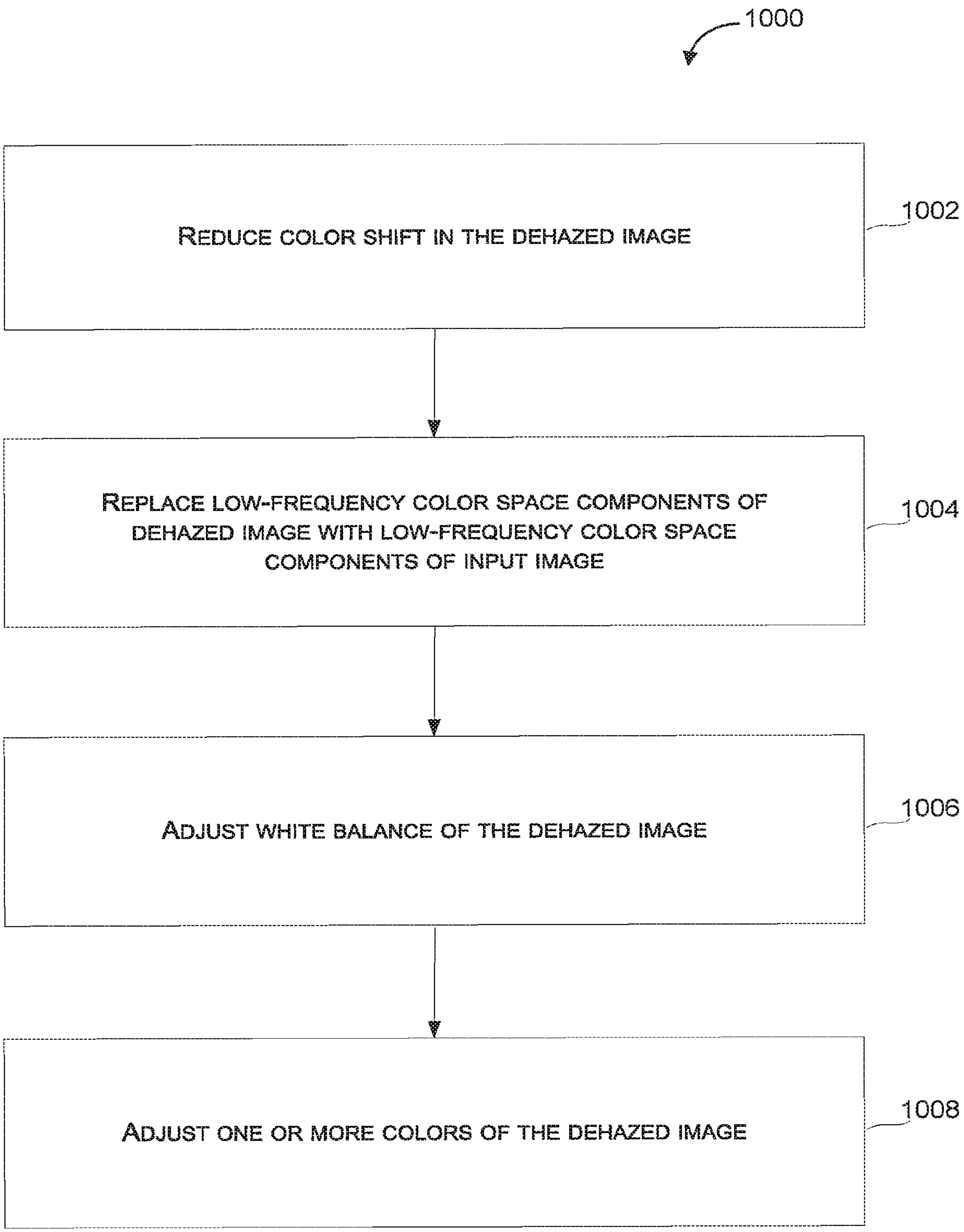
FIG. 10 depicts a flow diagram of performing haze reduction operations according to example embodiments of the present disclosure.

FIG. 10 depicts a flow diagram of performing haze reduction operations according to example embodiments of the present disclosure according to example embodiments of the present disclosure. One or more portions of the method 1000 can be executed and/or implemented on one or more computing devices or computing systems including, for example, the computing device 102, the computing system 130, the training computing system 150, and/or the remote computing system 170. In some embodiments, one or more portions of the method 1000 can be performed as part of the method 700 that is depicted in FIG. 7. Further, one or more portions of the method 1000 can be executed or implemented as an algorithm on the hardware devices or systems disclosed herein. FIG. 10 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1002, the method 1000 can include reducing color shift in the dehazed image that resulted from use of one or more color correction operations applied to the input image. For example, the computing system 130 can perform one or more color correction operations including determining the difference in color between one or more portions of the input image and one or more corresponding portions of the dehazed image. The computing system 130 can reduce the color shift in the dehazed image by adjusting the color in each of the plurality of points based at least in part on the difference in color between the one or more portions of the input image and the one or more corresponding portions of the dehazed image. In some embodiments, the color of each of the plurality of points in the dehazed image can be adjusted by the amount of difference with the color of each of the corresponding plurality of points in the input image.

At 1004, the method 1000 can include replacing low-frequency color space components of the dehazed image with low-frequency color space components of the input image. For example, the computing system 130 can use chrominance channels of an RGB dehazed image and replace their low-frequency components in the Fourier domain with low frequency chrominance channels of the input image.

At 1006, the method 1000 can include adjusting a white balance and/or color balance of the dehazed image. For example, the computing system 130 can perform one or more chromatic adaptation operations to adjust the white balance and/or color balance of the dehazed image. In some embodiments, the white balance and/or color balance can be adjusted based at least in part on one or more criteria associated with the color information (e.g., hue, saturation, and/or intensity/brightness) and/or color space components of each of the plurality of points in the dehazed image.

At 1008, the method 1000 can include adjusting one or more colors of the dehazed image based at least in part on conversion of a color space of the dehazed image to a different color space. For example, the computing system 130 can perform one or more conversion operations to change the color space of the dehazed image from the RGB color space to a YUV color space.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of noise reduction, the computer-implemented method comprising:
- determining, by a computing system comprising one or more processors, an image type associated with an input image;
- selecting, by the computing system, a respective size for each of a plurality of feature windows based on the image type associated with the input image;
- generating, by the computing system, based on the input image, a plurality of feature vectors associated with the plurality of feature windows for a point among a plurality of points in the input image;
- providing, by the computing system, the plurality of feature vectors as an input to one or more machine-learned models to generate a noise magnitude map associated with an amount of noise at the point;
- generating, by the computing system, based on the noise magnitude map and a guided filter, a refined noise magnitude map;
- generating, by the computing system, a denoised image based on applying the refined noise magnitude map to the input image; and
- generating, by the computing system, a color corrected denoised image based on performing one or more color correction operations on the denoised image including replacing, by the computing system, low-frequency color space components of the denoised image with low-frequency color space components of the input image.

2. The computer-implemented method of claim 1, wherein the image type is determined based on content depicted in the input image.

3. The computer-implemented method of claim 2, wherein the content depicted in the input image is associated with color values of the plurality of points in the input image.

4. The computer-implemented method of claim 3, further comprising:
- selecting a first size for a first feature window when corresponding points in a first region of the input image have a variation in color values indicating a same first feature in the input image; and selecting a second size for a second feature window when corresponding points in the first region of the input image have the variation in the color values indicating a change from the first feature to a second feature in the input image, the second size being smaller than the first size.

5. The computer-implemented method of claim 2, further comprising determining the content depicted in the input image based on metadata associated with the input image.

6. The computer-implemented method of claim 1, further comprising:

determining, for a first feature window among the plurality of feature windows, a dark pixel;

determining a hue value, a saturation value, a luminance intensity value, and a smallest channel value of the dark pixel; and generating, for the first feature window, a first feature vector among the plurality of feature vectors, which includes the hue value, the saturation value, the luminance intensity value, and the smallest channel value of the dark pixel.

7. The computer-implemented method of claim 1, wherein each of the plurality of feature windows comprises a center point and a plurality of points clustered around the center point.

8. The computer-implemented method of claim 7, wherein the plurality of feature windows comprise multi-scale feature windows of different sizes and wherein each of the multi-scale feature windows comprises a different number of the plurality of points.

9. The computer-implemented method of claim 1, wherein generating, by the computing system, based on the noise magnitude map and the guided filter, the refined noise magnitude map, comprises:

using, by the computing system, the input image as a guidance image for the guided filter.

10. The computer-implemented method of claim 1, wherein replacing, by the computing system, the low-frequency color space components of the denoised image with the low-frequency color space components of the input image comprises:

converting the input image and the denoised image from a first color space to a second color space;

replacing low-frequency components of a portion of channels from the second color space of the denoised image with low-frequency components of the portion of channels from the second color space of the input image; and converting the second color space of the denoised image back to the first color space.

11. The computer-implemented method of claim 1, wherein the generating, by the computing system, the color corrected denoised image based on performing the one or more color correction operations on the denoised image comprises at least one of:

adjusting, by the computing system, a white balance of the denoised image; or reducing, by the computing system, a color shift in the denoised image that resulted from use of one or more color correction operations applied to the input image.

12. The computer-implemented method of claim 1, wherein the generating, by the computing system, the color corrected denoised image based on performing the one or more color correction operations on the denoised image comprises:

adjusting, by the computing system, one or more colors of the denoised image based on conversion of a color space of the denoised image to a different color space, wherein the input image is associated with an RGB color space and the denoised image is associated with a YUV color space, and wherein the conversion of the color space of the denoised image to the different color space comprises converting the denoised image from the YUV color space to the RGB color space.

13. The computer-implemented method of claim 1, wherein the plurality of feature vectors include values associated with one or more features of the plurality of feature windows, the one or more features comprising a dark channel, a hue, a saturation, and an intensity.

14. One or more tangible non-transitory computer-readable media storing computer-readable instructions that when executed by one or more processors cause the one or more processors to perform operations, the operations comprising:

determining an image type associated with an input image;

selecting a respective size for each of a plurality of feature windows based on the image type associated with the input image;

generating, based on the input image, a plurality of feature vectors associated with the plurality of feature windows for a point among a plurality of points in the input image;

providing the plurality of feature vectors as an input to one or more machine-learned models to generate a noise magnitude map associated with an amount of noise at the point;

generating, based on the noise magnitude map and a guided filter, a refined noise magnitude map;

generating a denoised image based on application of the refined noise magnitude map to the input image; and generating a color corrected denoised image based on performing one or more color correction operations on the denoised image including replacing low-frequency color space components of the denoised image with low-frequency color space components of the input image.

15. The one or more tangible non-transitory computer-readable media of claim 14, wherein the image type is determined based on content depicted in the input image, and the content depicted in the input image is associated with color values of the plurality of points in the input image.

16. The one or more tangible non-transitory computer-readable media of claim 15, wherein the operations further comprise:

selecting a first size for a first feature window when corresponding points in a first region of the input image have a variation in color values indicating a same first feature in the input image; and selecting a second size for a second feature window when corresponding points in the first region of the input image have the variation in the color values indicating a change from the first feature to a second feature in the input image, the second size being smaller than the first size.

17. A computing system comprising:

one or more processors;

one or more non-transitory computer-readable media storing instructions that when executed by the one or more processors cause the one or more processors to perform operations comprising:

determining an image type associated with an input image;

selecting a respective size for each of a plurality of feature windows based on the image type associated with the input image;

generating, based on the input image, a plurality of feature vectors associated with the plurality of feature windows for a point among a plurality of points in the input image;

providing the plurality of feature vectors as an input to one or more machine-learned models to generate a noise magnitude map associated with an amount of haze noise at the point;

generating, based on the noise magnitude map and a guided filter, a refined noise magnitude map;

generating a denoised image based on applying the refined noise magnitude map to the input image; and generating a color corrected denoised image based on performing one or more color correction operations on the denoised image including replacing low-frequency color space components of the denoised image with low-frequency color space components of the input image.

18. The computing system of claim 17, wherein the image type is determined based on content depicted in the input image, and the content depicted in the input image is associated with color values of the plurality of points in the input image.

19. The computing system of claim 18, wherein the operations further comprise:

selecting a first size for a first feature window when corresponding points in a first region of the input image have a variation in color values indicating a same first feature in the input image; and selecting a second size for a second feature window when corresponding points in the first region of the input image have the variation in the color values indicating a change from the first feature to a second feature in the input image, the second size being smaller than the first size.

20. A computer-implemented method of noise reduction, the computer-implemented method comprising:

determining, by a computing system comprising one or more processors, an image type associated with an input image;

selecting, by the computing system, a respective size for each of a plurality of feature windows based on the image type associated with the input image;

generating, by the computing system, based on the input image, a plurality of feature vectors associated with the plurality of feature windows for a point among a plurality of points in the input image, wherein generating a first feature vector among the plurality of feature vectors comprises:

determining, for a first feature window among the plurality of feature windows, a dark pixel;

determining a hue value, a saturation value, a luminance intensity value, and a smallest channel value of the dark pixel; and generating, for the first feature window, the first feature vector which includes the hue value, the saturation value, the luminance intensity value, and the smallest channel value of the dark pixel;

providing, by the computing system, the plurality of feature vectors as an input to one or more machine-learned models to generate a noise magnitude map associated with an amount of noise at the point;

generating, by the computing system, based on the noise magnitude map and a guided filter, a refined noise magnitude map;

generating, by the computing system, a denoised image based on applying the refined noise magnitude map to the input image; and generating, by the computing system, a color corrected denoised image based on performing one or more color correction operations on the denoised image.

* * * * *